United States Patent
Rahman et al.

(10) Patent No.: US 10,250,313 B2
(45) Date of Patent: Apr. 2, 2019

(54) METHOD AND APPARATUS FOR COVARIANCE MATRIX FEEDBACK IN ADVANCED WIRELESS COMMUNICATION SYSTEMS

(71) Applicant: Samsung Electronics Co., Ltd., Gyeonggi-do (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/913,615

(22) Filed: Mar. 6, 2018

(65) Prior Publication Data

US 2018/0262253 A1  Sep. 13, 2018

Related U.S. Application Data

(60) Provisional application No. 62/469,143, filed on Mar. 9, 2017.

(51) Int. Cl.
  *H04L 1/02* (2006.01)
  *H04B 7/06* (2006.01)
  (Continued)

(52) U.S. Cl.
  CPC ......... *H04B 7/0626* (2013.01); *H04B 7/0452* (2013.01); *H04B 7/0639* (2013.01); *H04L 25/021* (2013.01); *H04L 25/0242* (2013.01)

(58) Field of Classification Search
  CPC ....... H04L 1/0618; H04L 1/06; H04L 25/021; H04L 25/0242; H04L 1/0026;
  (Continued)

(56) References Cited

U.S. PATENT DOCUMENTS

2011/0188393 A1*  8/2011  Mallik .................. H04B 7/024
                                                      370/252
2011/0273993 A1*  11/2011 Mazzarese ............ H04L 1/0026
                                                      370/241

(Continued)

OTHER PUBLICATIONS

"3rd Generation Partnership Project; Technical Specification Group Services and System Aspects; Feasibility Study on New Services and Markets Technology Enablers; Stage 1 (Release 14)," 3GPP TS 22.891, V1.2.0, Nov. 2015, 96 pages.

(Continued)

*Primary Examiner* — Khai Tran

(57) ABSTRACT

A method for channel state information (CSI) feedback by a user equipment (UE) is provided. The method comprises receiving, by the UE from a base station (BS), CSI feedback configuration information to report a covariance matrix indicator (CMI) indicating a N×N channel covariance matrix (K) associated with a downlink channel matrix, wherein N is a number of antenna ports at the BS; identifying, by the UE, the CMI that indicates a set of L basis vectors $\{a_i\}$, i=0, 1, 2, ..., L−1, each comprising a dimension N×1, and a set of $L^2$ coefficients, $\{c_{i,j}\}$, i,j=0, 1, 2, ..., L−1, and that represent the covariance matrix (K) as a weighted linear sum $\tilde{K} = \sum_{i=0}^{L-1} \sum_{j=0}^{L-1} c_{i,j} a_i a_j^H$, wherein L≤N and $^H$ denotes a Hermitian transpose, and transmitting, by the UE to the BS, the CSI feedback including the identified CMI over an uplink channel.

20 Claims, 15 Drawing Sheets

(51) Int. Cl.
*H04B 7/0452* (2017.01)
*H04L 25/02* (2006.01)

(58) Field of Classification Search
CPC .... H04B 7/0478; H04B 7/069; H04B 7/0486; H04B 7/052; H04B 7/0626; H04B 7/06632
USPC ........ 375/267, 130, 136, 146, 260; 370/329; 342/368
See application file for complete search history.

(56) References Cited

U.S. PATENT DOCUMENTS

2014/0112406 A1   4/2014   Zhu et al.
2017/0302353 A1*  10/2017  Rahman ............... H04B 7/0478

OTHER PUBLICATIONS

"3rd Generation Partnership Project; Technical Specification Group Radio Access Network; Evolved Universal Terrestrial Radio Access (E-UTRA); Physical Channels and Modulation (Release 14)," 3GPP TS 36.211, V14.1.0, Dec. 2016, 175 pages.
"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.1.0, Dec. 2016, 176 pages.
"3rd Generation Partnership Project; Technical Specification Group Radio Access Network; Evolved Universal Terrestrial Radio Access (E-UTRA); Physical Layer Procedures (Release 14)," 3GPP TS 36.213, V14.1.0, Dec. 2016, 414 pages.
"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321, V14.1.0, Dec. 2016, 98 pages.
"3rd Generation Partnership Project; Technical Specification Group Radio Access Network; Evolved Universal Terrestrial Radio Access (E-UTRA); Radio Resource Control (RRC); Protocol Specification (Release 14)," 3GPP TS 36.331, V14.1.0, Dec. 2016, 654 pages.
ISA/KR, "International Search Report," International Application No. PCT/KR2018/002840, dated Jun. 26, 2018, 5 pages.
Intel Corporation, "On NR Type II category 2 codebook," R1-1702206, 3GPP TSG RAN WG1 Meeting #88, Athens, Greece, Feb. 13-17, 2017, 5 pages.
Nokia, et al., "On Type II CSI Feedback in NR," R1-1703175, 3GPP TSG RAN WG1 Meeting #88, Athens, Greece, Feb. 13-17, 2017, 6 pages.
NTT Docomo, "CSI Feedback Type II for NR MIMO," R1-1702843, 3GPP TSG RAN WG1 Meeting #88, Athens, Greece, Feb. 13-17, 2017, 7 pages.
Zte, et al., "Linear combination based CSI feedback design for NR MIMO," R1-1701809, 3GPP TSG RAN WG1 Meeting #88, Athens, Greece, Feb. 13-17, 2017, 9 pages.

* cited by examiner

METHOD AND APPARATUS FOR COVARIANCE MATRIX FEEDBACK IN ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/469,143, filed on Mar. 9, 2017. The content of the above-identified patent document is incorporated herein by reference.

TECHNICAL FIELD

The present disclosure relates generally to feedback operation in wireless communication systems and, more specifically, to covariance matrix feedback in advanced wireless communication systems.

BACKGROUND

5th generation (5G) mobile communications, initial commercialization of which are expected around 2020, are recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

Embodiments of the present disclosure provide a covariance matrix feedback in an advanced wireless communication system.

In one embodiment, a user equipment (UE) for channel state information (CSI) feedback is provided. The UE includes a transceiver configured to receive, from a base station (BS), CSI feedback configuration information to report a covariance matrix indicator (CMI) indicating a N×N channel covariance matrix (K) associated with a downlink channel matrix, wherein N is a number of antenna ports at the BS. The UE further includes a processor operably connected to the transceiver, the processor configured to identity the CMI that indicates a set of L basis vectors $\{a_i\}$, i=0, 1, 2, . . . , L−1, each comprising a dimension N×1, and a set of $L^2$ coefficients, $\{c_{i,j}\}$, i,j=0, 1, 2, . . . , L−1, and that represent the covariance matrix (K) as a weighted linear sum $\tilde{K}=\sum_{i=0}^{L-1}\sum_{j=0}^{L-1} c_{i,j} a_i a_j^H$, wherein L≤N and $^H$ denotes a Hermitian transpose, wherein the transceiver is further configured to transmit, to the BS, the CSI feedback including the identified CMI over an uplink channel.

In another embodiment, a BS for CSI feedback is provided. The BS includes a processor configured to generate CSI feedback configuration information for reporting of a CMI indicating a N×N channel covariance matrix (K) associated with a downlink channel matrix, wherein N is a number of antenna ports at the BS. The BS further includes a transceiver operably connected to the processor, the transceiver configured to transmit, to a UE, the CSI feedback configuration information; and receive, from the UE, the CSI feedback including the reported CMI over an uplink channel, wherein the reported CMI indicates a set of L basis vectors $\{a_i\}$, i=0, 1, 2, . . . , L−1, each comprising a dimension N×1, and a set of $L^2$ coefficients, $\{c_{i,j}\}$, i,j=0, 1, 2, . . . , L−1, and that represent the covariance matrix (K) as a weighted linear sum $\tilde{K}=\sum_{i=0}^{L-1}\sum_{j=0}^{L-1} c_{i,j} a_i a_j^H$, and wherein L≤N and $^H$ denotes a Hermitian transpose.

In yet another embodiment, a method for CSI feedback by a UE is provided. The method comprises receiving, by the UE from a BS, CSI feedback configuration information to report a CMI indicating a N×N channel covariance matrix (K) associated with a downlink channel matrix, wherein N is a number of antenna ports at the BS; identifying, by the UE, the CMI that indicates a set of L basis vectors $\{a_i\}$, i=0, 1, 2, . . . , L−1, each comprising a dimension N×1, and a set of $L^2$ coefficients, $\{c_{i,j}\}$, i,j=0, 1, 2, . . . , L−1, and that represent the covariance matrix (K) as a weighted linear sum $\tilde{K}=\sum_{i=0}^{L-1}\sum_{j=0}^{L-1} c_{i,j} a_i a_j^H$, wherein L≤N and $^H$ denotes a Hermitian transpose; and transmitting, by the UE to the BS, the CSI feedback including the identified CMI over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" 3GPP TS 36.331 v14.1.0, "E-UTRA, Radio Resource Control (RRC) protocol specification" and 3GPP TR 22.891 v1.2.0, "Feasibility Study on New Services and Markets Technology Enablers."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
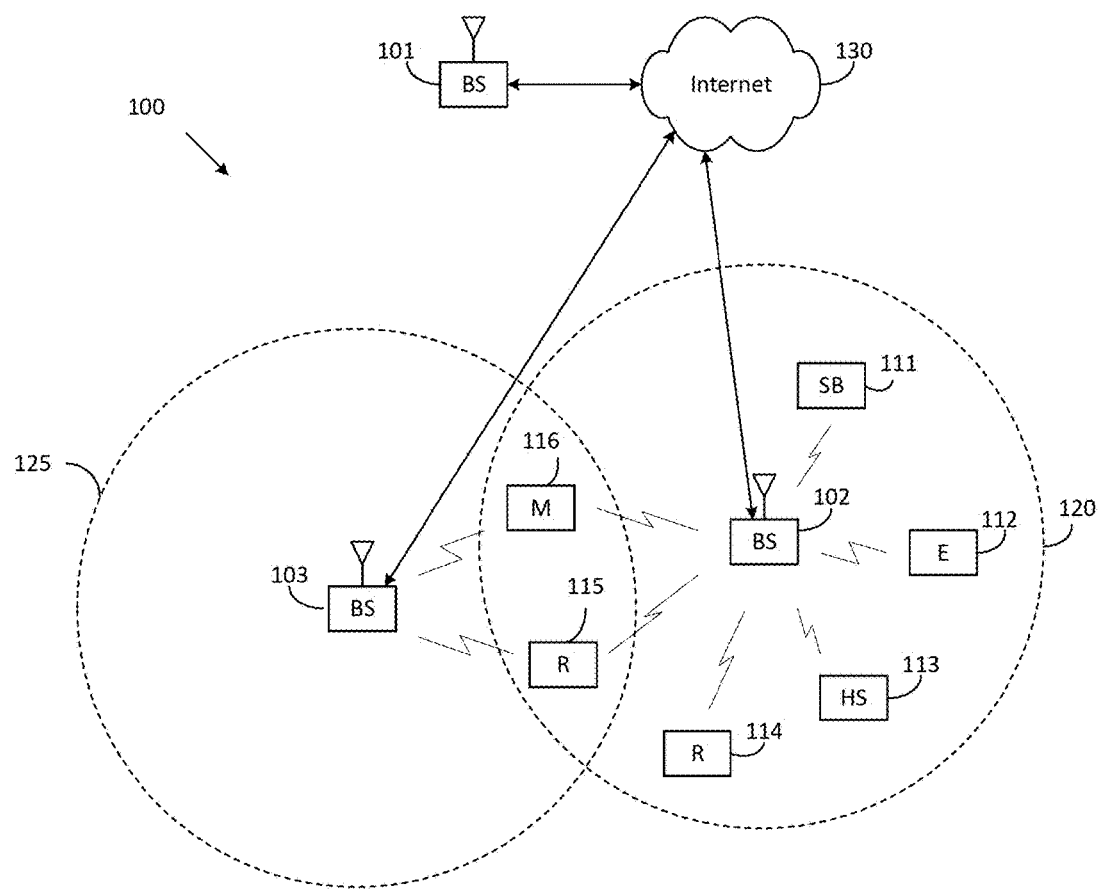
FIG. 1 illustrates an example wireless network according to embodiments of the present disclosure.
Figure 2:
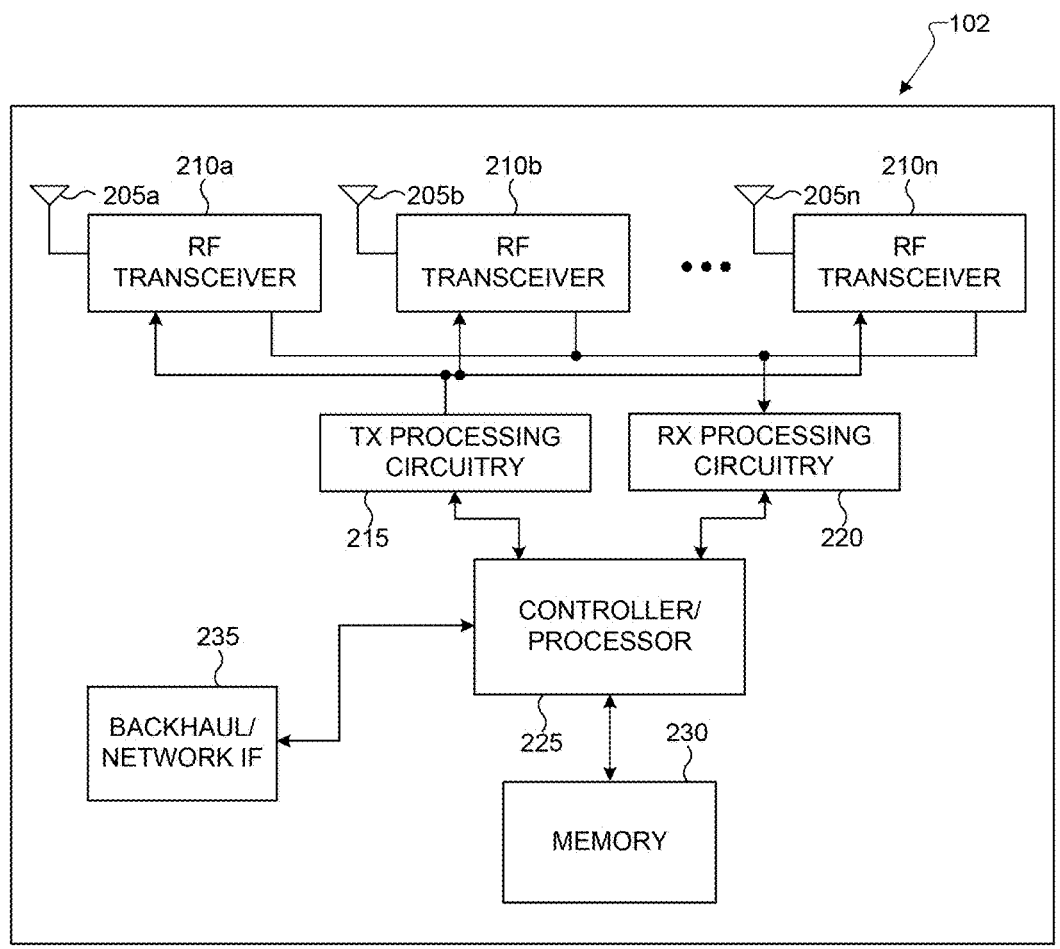
FIG. 2 illustrates an example eNB according to embodiments of the present disclosure.
Figure 3:
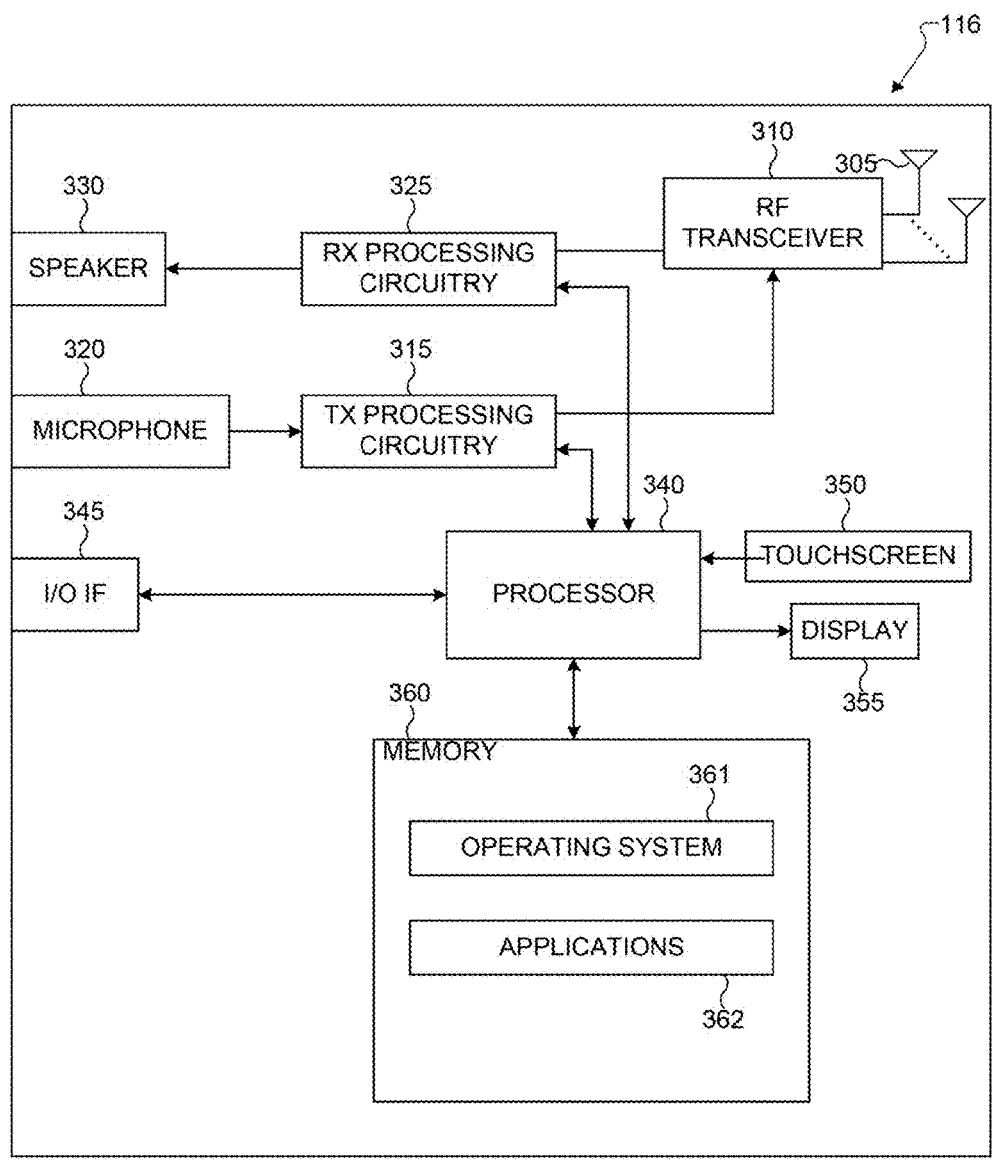
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient covariance matrix feedback in an advanced wireless communication system. In certain embodiments, and one or more of the eNBs 101-103 includes circuitry, programming, or a combination thereof, for receiving efficient covariance matrix feedback in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
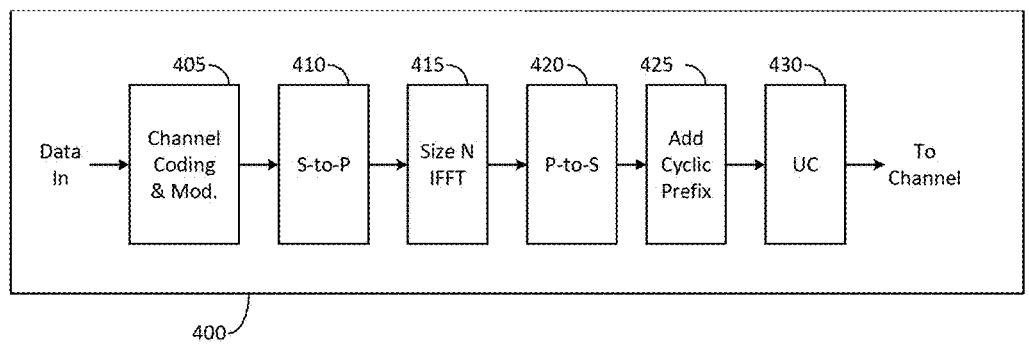
FIG. 4A illustrates a high-level diagram of an orthogonal frequency division multiple access transmit path according to embodiments of the present disclosure.
Figure 4B:
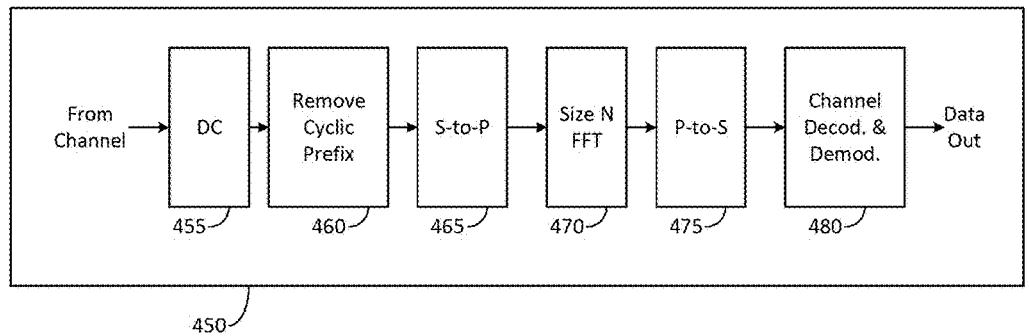
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
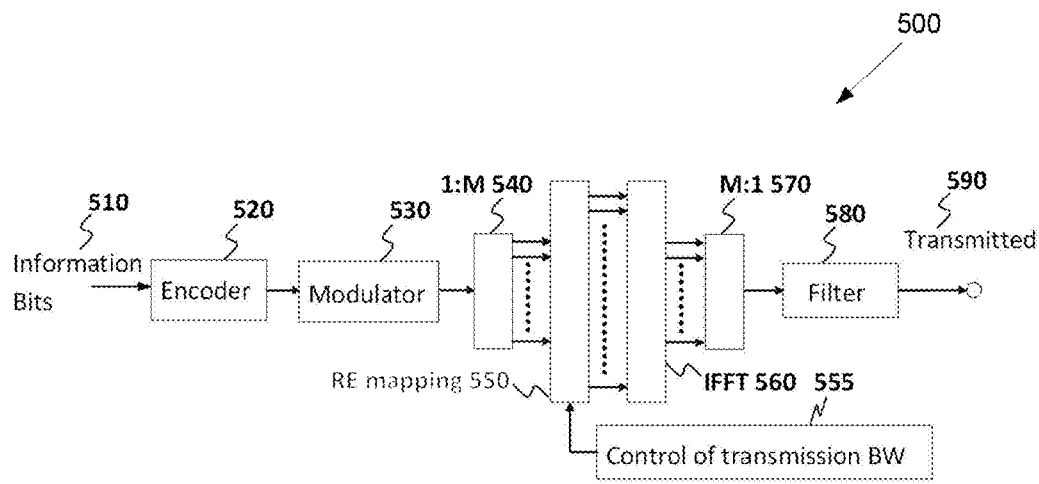
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
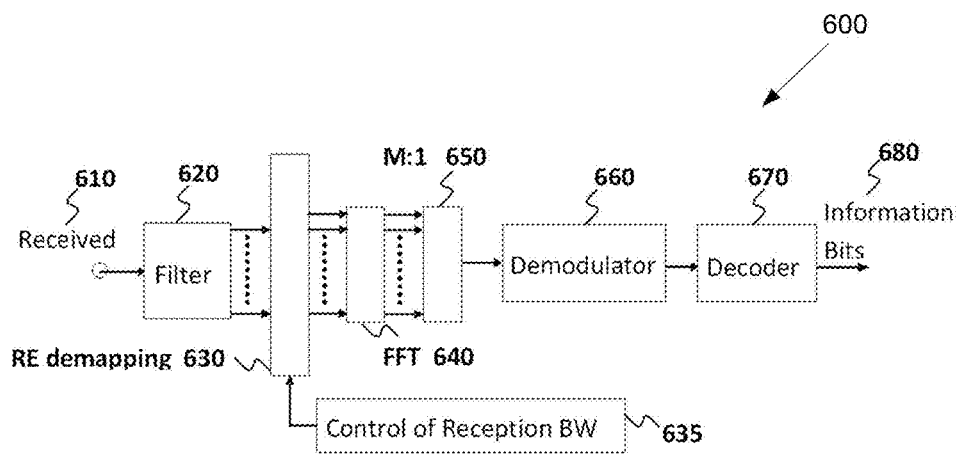
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
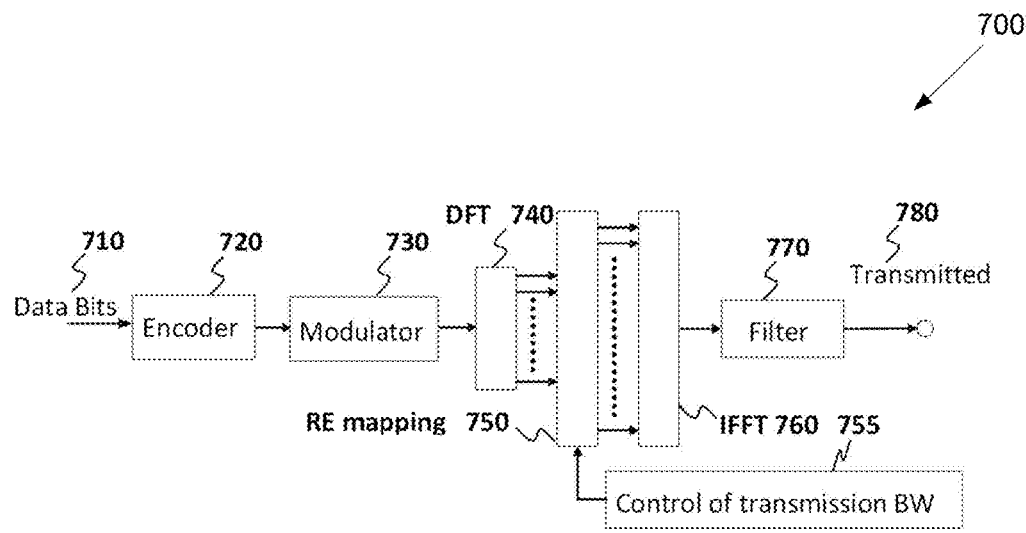
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
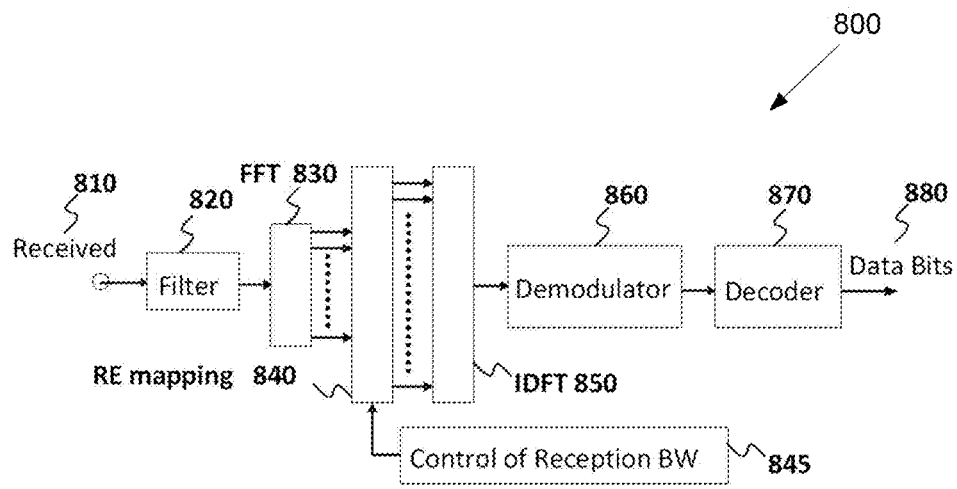
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP specification, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
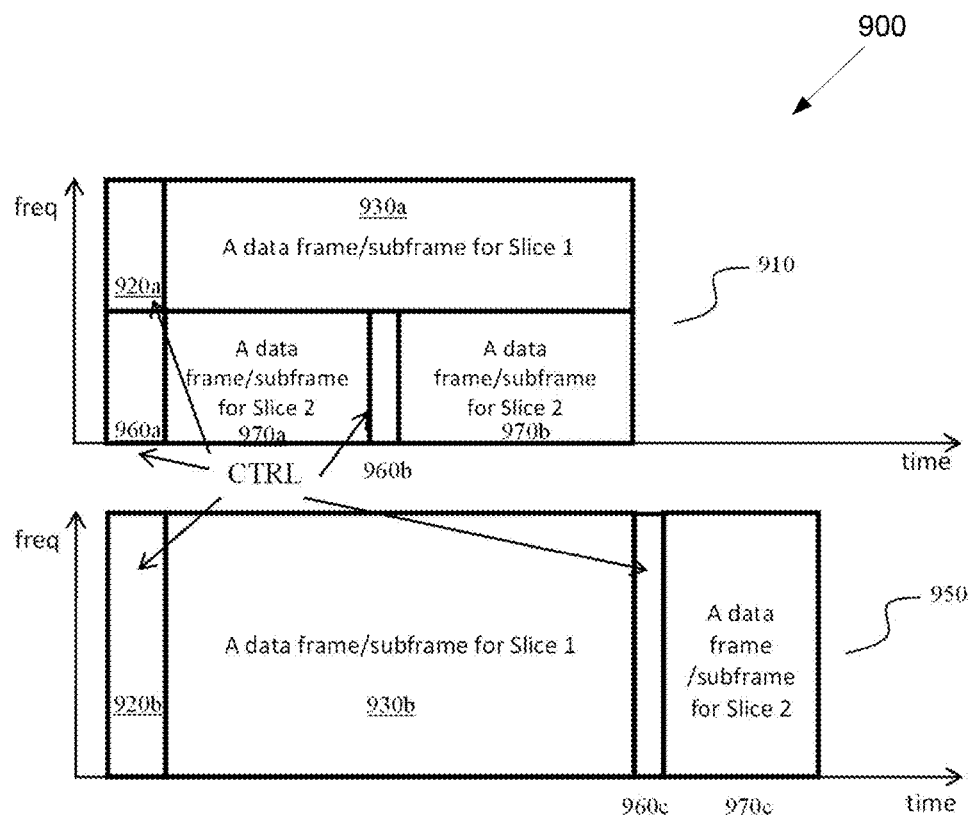
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
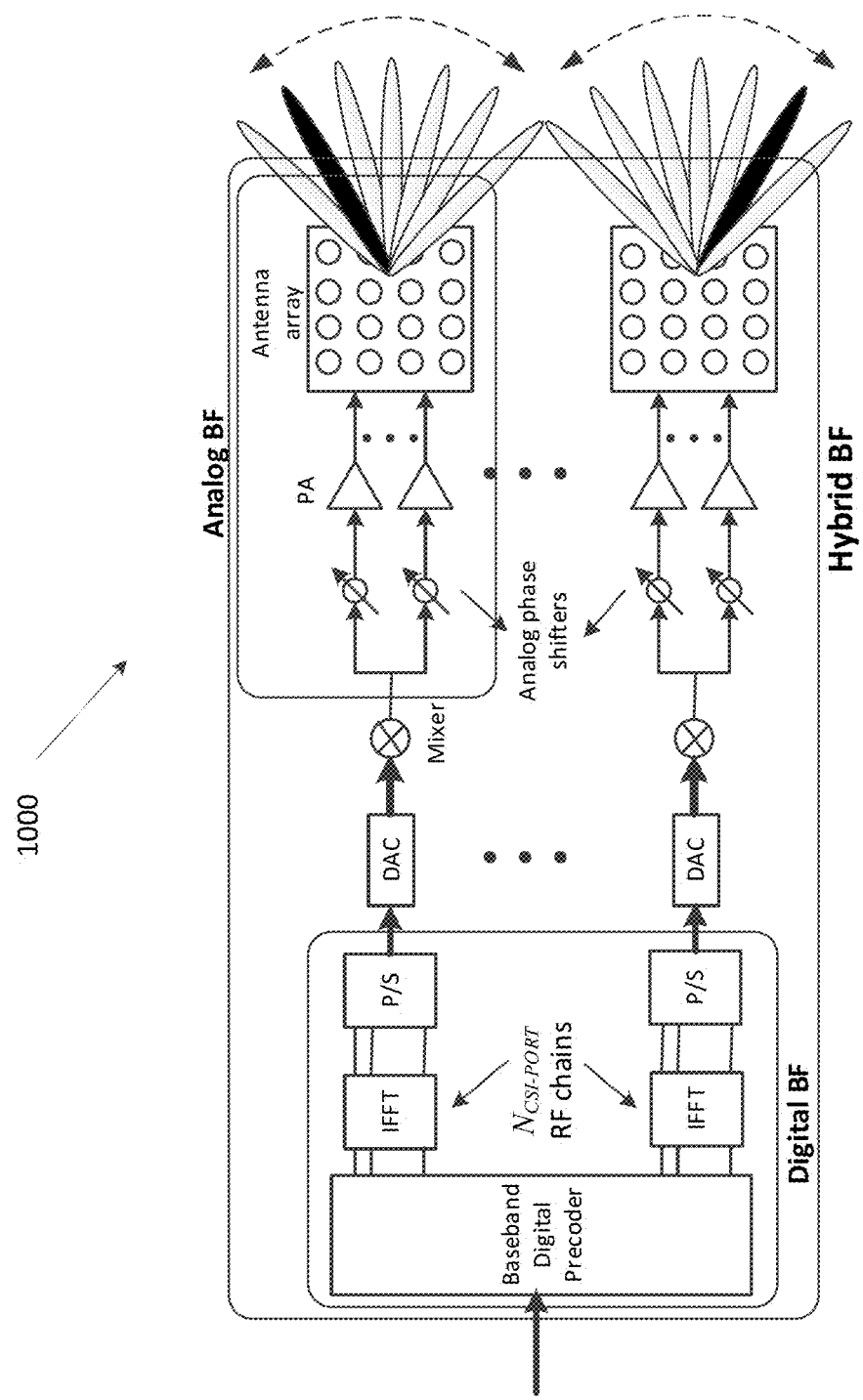
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from an eNB, and CSI acquisition and feedback from a UE.

In LTE FDD systems, the CSI feedback framework is "implicit" in the form of CQI/PMI/RI (and CRI in LTE specification) derived from a codebook assuming SU transmission from an eNB. Because of the inherent SU assumption while deriving CSI, this implicit CSI feedback is inadequate for MU transmission. Since future systems are likely to be more MU-centric, this SU-MU CSI mismatch may be a bottleneck in achieving high MU performance gains. Another issue with implicit feedback is the scalability with larger number of antenna ports at an eNB. For large number of antenna ports, the codebook design for implicit feedback is quite complicated (for example, a total number of Class A codebooks=44), and the designed codebook is not guaranteed to bring justifiable performance benefits in practical deployment scenarios (for example, only a small percentage gain can be shown at the most).

Realizing aforementioned issues, the LTE specification support has been provided for advanced CSI reporting, which, at the very least, can serve as a good starting point to design advanced CSI scheme and beyond LTE and NR MIMO systems. Compared to eFD-MIMO, the CSI acquisition and beyond LTE and NR MIMO systems may consider the following additional differentiating factors.

In one example of flexibility CSI reporting framework, CSI reporting supports users with different CSI reporting capabilities. For example, some users may only be capable of reporting implicit CSI in the form of PMI/CQI/RI as in legacy LTE systems and some other users may be capable of reporting both implicit as well as explicit channel reporting. In addition, UE motilities can range from 0 kmph to 500 kmph. So, CSI reporting framework may be able to support such diverse use cases and UE capabilities.

In one example of increased number of antenna ports, in future MIMO systems, the number of antenna elements at the eNB can be up to 256, which mean that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for Rel. 14 eFD-MIMO. Such high throughput requirements can only met with a mechanism to provide very accurate CSI to the eNB.

In one example of beamforming, following the trend established in FD-MIMO in LTE specification and beyond LTE and NR MIMO systems may be beam-formed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

In view of the aforementioned issues with the implicit feedback paradigm in LTE systems, and the additional differentiating factors specific with LTE system and beyond LTE and NR MIMO, it can be made the observation that the implicit CSI feedback scheme alone is not enough, and hence advanced CSI is needed. The main driver, as mentioned above, is MU-MIMO.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

In the following, it is assumed that $N_1$ and $N_2$ are the number of antenna ports with the same polarization in the first and second dimensions, respectively. For 2D antenna port layouts, there may be $N_1>1$, $N_2>1$, and for 1D antenna port layouts, the number of antenna ports may either have $N_1>1$ and $N_2=1$ or $N_2>1$ and $N_1=1$. In the rest of the present disclosure, 1D antenna port layouts with $N_1>1$ and $N_2=1$ is considered. The present disclosure, however, is applicable to the other 1D port layouts with $N_2>1$ and $N_1=1$. For a dual-polarized antenna port layout, the total number of antenna ports is $2N_1N_2$.

Figure 11:
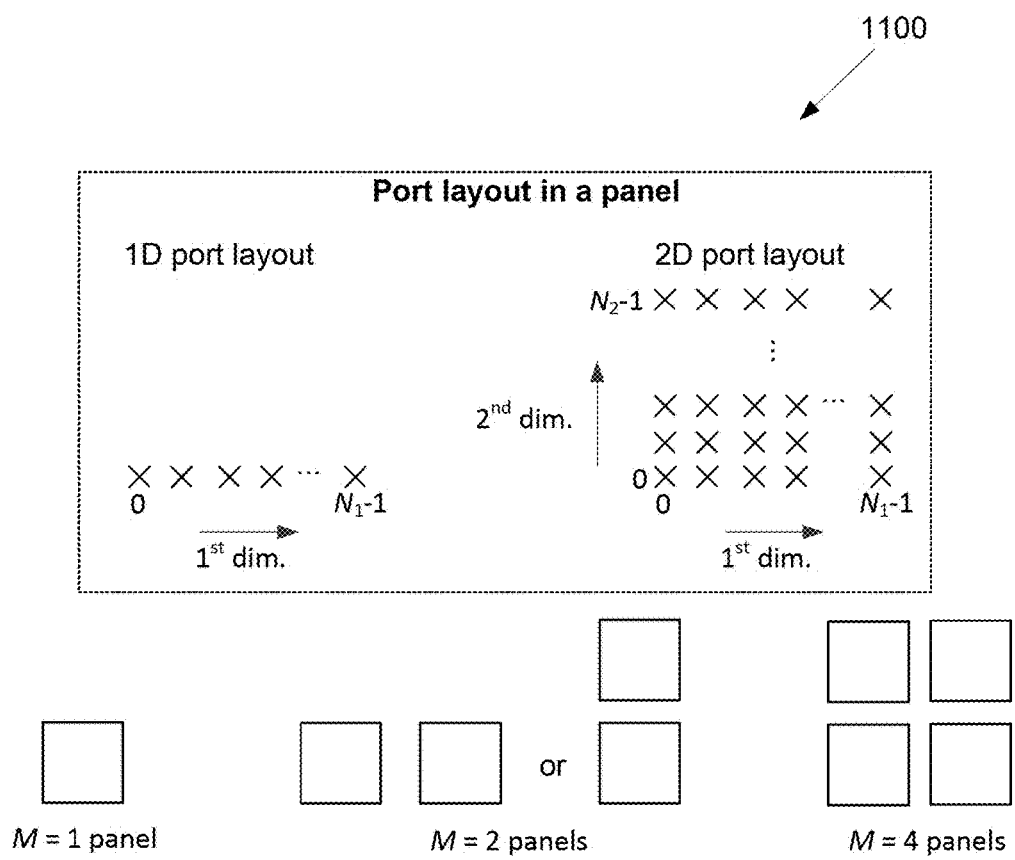
FIG. 11 illustrates an example multiple antenna panels according to embodiments of the present disclosure.

FIG. 11 illustrates an example multiple antenna panels 1100 according to embodiments of the present disclosure. The embodiment of the multiple antenna panels 1100 illustrated in FIG. 11 is for illustration only. FIG. 11 does not limit the scope of this disclosure to any particular implementation.

The embodiments of the present disclosure is applicable to a setup in which multiple antenna panels are applied where each panel is a dual-polarized antenna ports with $N_1$ and $N_2$ ports in two dimensions. An illustration is shown in FIG. 11 in which there are $N_1$ antenna panels. Note that the antenna port layouts may or may not be the same in different antenna panel.

Figure 12:
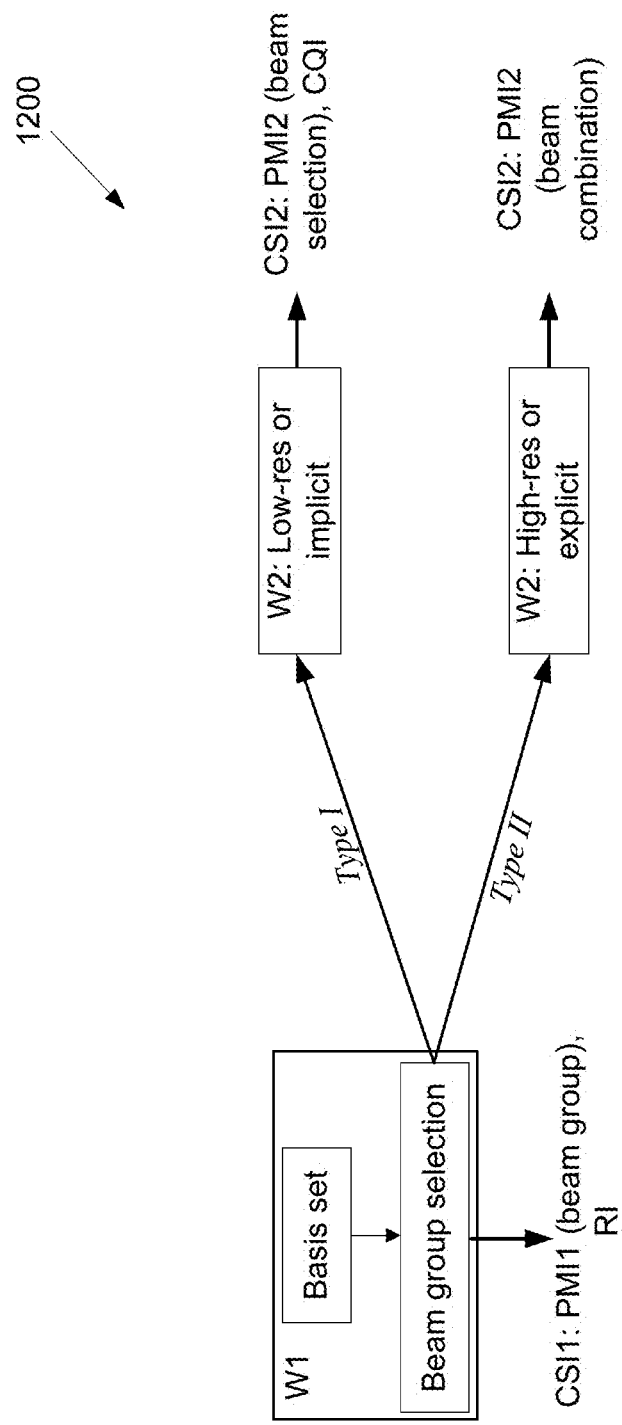
FIG. 12 illustrates an example dual-resolution CSI reporting framework according to embodiments of the present disclosure.

FIG. 12 illustrates an example dual-resolution CSI reporting framework 1200 according to embodiments of the present disclosure. The embodiment of the dual-resolution CSI reporting framework 1200 illustrated in FIG. 12 is for illustration only. FIG. 12 does not limit the scope of this disclosure to any particular implementation.

A dual-resolution CSI reporting framework in communication systems shown in FIG. 12, in which two types of CSI resolution, namely Type I for low-resolution CSI and Type II for high-resolution CSI, can be reported. Each of the two CSI resolution types has at least two CSI components: the first CSI component (i.e., CSI1) is common or different to both resolution types and indicates the selection of a beam group (comprising of L beams), e.g. using the first PMI (PMI1). CSI1 may also include a rank indicator (i.e., RI in Type I CSI) associated with the selected beam group. The second CSI component (i.e., CSI2) is specific to the configured CSI resolution type.

In one embodiment of Type I for low-resolution CSI reporting, CSI2 is derived based on implicit CSI reporting framework (e.g. up to LTE specification Class A codebook based CSI reporting) and includes CSI components such as the second PMI (PMI2) and CQI, where PMI2 indicates beam selection from the beam group indicated by PMI1 and co-phase for two polarizations.

In one embodiment of Type II for high-resolution CSI reporting, CSI2 is derived to report a form of quantized DL channel explicitly in order to facilitate more accurate CSI to the gNB, where the quantized explicit CSI is reported based on linear combination of beams in the beam group indicated by PMI1.

Similar to LTE dual-stage codebook such as LTE Class A codebook, the codebook for the dual-resolution CSI reporting is a dual-stage codebook: $W=W_1W_2$, where the first stage $W_1$ codebook is used to report a beam group for both Type I and Type II CSI using the first PMI (PMI1), and the second stage $W_2$ codebook is used to report beam selection for implicit feedback (Type I CSI) and beam combination for explicit feedback (Type II CSI) using the second PMI (PMI2).

For Type II or high-resolution CSI, the following two categories of schemes for explicit feedback are proposed. In one example of category 1, the beam combination is used to quantize pre-coders, which can be an estimate of channel eigenvectors or any general beamforming vectors. In another example of category 2, the beam combination is used to quantize a matrix, which can be an estimate of channel covariance matrix or any general matrices.

Figure 13:
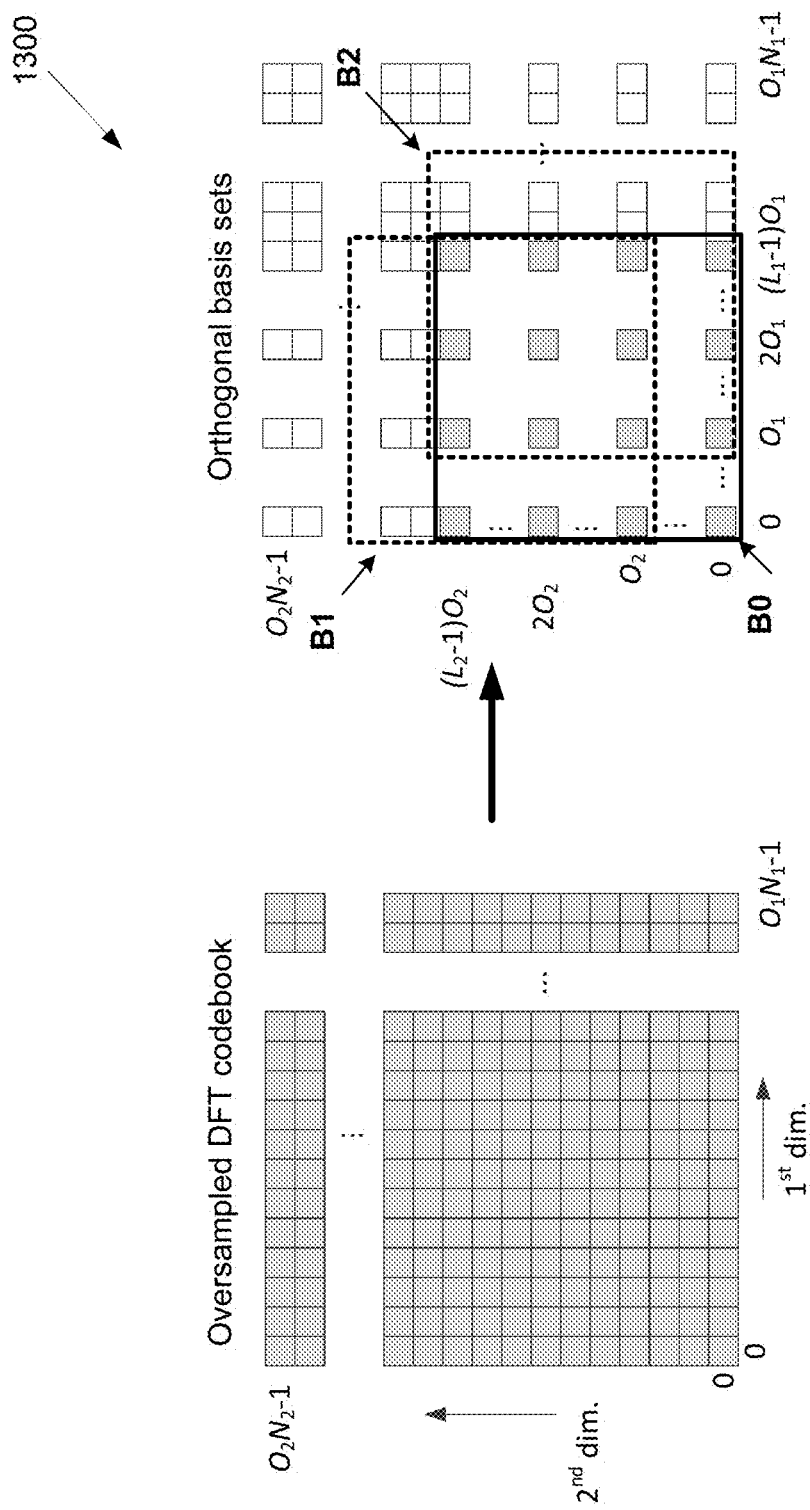
FIG. 13 illustrates an example orthogonal basis set construction according to embodiments of the present disclosure.

FIG. 13 illustrates an example orthogonal basis set construction 1300 according to embodiments of the present disclosure. The embodiment of the orthogonal basis set construction 1300 illustrated in FIG. 13 is for illustration only. FIG. 13 does not limit the scope of this disclosure to any particular implementation.

In some embodiment 1, a UE is configured with a dual-stage $W=W_1W_2W_1^H$ codebook for explicit covariance matrix reporting for a single antenna panel, where $W_1$ codebook is used to select: an orthogonal basis set comprising of uniformly spaced ($L_1$, $L_2$) DFT beams as shown in FIG. 13; and L beams freely out of the $L_1L_2$ DFT beams in a basis set, where L is either fixed or (e.g. RRC) configurable or a UE reports a preferred L value. The set of supported L value(s) belongs to $\{1, 2, \ldots, N_1N_2\}$. The selection of basis set and L beams is WB or partial band (e.g. a set of SBs).

In such embodiment, two examples of basis set sizes are: restricted orthogonal basis set in which $L_1L_2=\min(a, bN_1N_2)$; and full orthogonal basis set in which $L_1L_2=bN_1N_2$, where an example of a=8, and b=1 or 2. Either only one of the two (restricted or full orthogonal) is supported in the specification or one of them is configured via RRC signaling.

The $W_1$ codebook structure is determined according to at least one of the following covariance matrix sub-categories. In one example of category 2A (block diagonal $W_1$), the dimension of the covariance matrix is $2N_1N_2 \times 2N_1N_2$ which includes the two polarizations and $W_1$ is block diagonal. At least one of the following two alternatives is supported.

In one instance of Alt 1-0 (common basis), $$W_1 = \begin{bmatrix} B & 0 \\ 0 & B \end{bmatrix},$$

where B is a $N_1N_2 \times L$ basis matrix whose columns correspond to L beams, i.e., $B=[b_0\ b_1\ \ldots\ b_{L-1}]$ and is a common basis for two polarizations 0 (or +45) and 1 (or −45). Note that in this alternative, selection of both basis set and L beams are common for two polarizations. In another instance of Alt 1-1 (per polarization basis)

$$W_1 = \begin{bmatrix} B_0 & 0 \\ 0 & B_1 \end{bmatrix},$$

where $B_0$ and $B_1$ are $N_1N_2 \times L$ basis matrices for two polarizations 0 (or +45) and 1 (or −45), respectively, i.e., $B_0=[b_{0,0}\ b_{0,1}\ \ldots\ b_{0,L-1}]$ and $B_1=[b_{1,0}\ b_{1,1}\ \ldots\ b_{1,L-1}]$. There are two sub-alternatives: (1) either both basis set and L beams are selected per polarization or (2) basis set selection is common for two polarizations and L beam selection is per polarization.

In another example of category 2B (non-block diagonal $W_1$), $W_1=B$ where B is a $cN_1N_2 \times L$ basis matrix whose columns correspond to L beams, i.e., $B=[b_0\ b_1\ \ldots\ b_{L-1}]$. At least one of the following two alternatives is supported. In one instance of Alt 1-2 (c=1), the dimension of the covariance matrix is $N_1N_2 \times N_1N_2$ which does not include the two polarizations, i.e., the covariance matrix is derived either for one of the two polarizations or by averaging across two polarizations. Note that this alternative is beneficial for WB and/or long-term covariance matrix reporting for hybrid CSI acquisition in two stages, first stage to report covariance matrix for UE-specific beam-formed CSI-RS and second stage to report PMI/CQI/RI. In another instance of Alt 1-3 (c=2), the dimension of the covariance matrix is $2N_1N_2 \times 2N_1N_2$ which includes the two polarizations.

$W_2$ codebook is used to represent the channel covariance matrix as a weighted linear combination, weight being $c_{i,j}$, of the outer products $b_i b_j^H$ of all beam pairs ($b_i$, $b_j$) formed from the columns of B (Alt 1-0, Alt 1-2, Alt 1-3)) or $B_0$ and $B_1$ (Alt 1-1). Therefore, $W_2$ codebook is used to select the Hermitian beam combining coefficient matrix C, which is $2L \times 2L$ (Alt 1-0, Alt 1-1, Alt 1-3) or $L \times L$ (Alt 1-2), and hence the channel covariance matrix is represented as $$W_1 W_2 W_1^H = \begin{bmatrix} B & 0 \\ 0 & B \end{bmatrix} C \begin{bmatrix} B & 0 \\ 0 & B \end{bmatrix}^H \text{ or}$$

$$\begin{bmatrix} B_0 & 0 \\ 0 & B_1 \end{bmatrix} C \begin{bmatrix} B_0 & 0 \\ 0 & B_1 \end{bmatrix}^H \text{ or } BCB^H.$$

The amplitude and phase of the combining coefficients $\{c_{i,j}\}_{i,j}$ are reported separately, where phase reporting is either WB or SB and amplitude reporting is either WB or SB or both WB and SB. The amplitude and phase reporting is determined according to at least one of the following alternatives. In one example of Alt 1-4 (fixed) both amplitude and phase reporting is WB. In another example of Alt 1-5 configured, for example via RRC or MAC CE or dynamic DCI signalling. For instance, 1 bit signalling can be used to indicate one of WB amplitude and WB phase reporting or WB amplitude and SB phase reporting.

Only one of category 2A and 2B, or one of Alt 1-0, Alt 1-1, Alt 1-2, and Alt 1-3 can be fixed in the specification. Alternatively, one of them is configured, for example via higher layer RRC signaling.

In the reset of the present disclosure Alt 1-1 is assumed. The embodiments of the present disclosure, however, are general and are applicable to Alt 1-0 by setting $B_0=B_1=B$ and also to other Alt 1-2 and Alt 1-3.

In some embodiments of 1A, a UE is configured with a dual-stage $W=W_1W_2$ codebook for explicit covariance matrix reporting for a single antenna panel, where $W_1$ codebook is used to select the basis matrices $B_0$ and $B_1$ as in Embodiment 1, and construct $W_1$ as being a $2N_1N_2 \times 8N_1N_2L^2$ matrix, whose columns correspond to the outer products of any two columns $a_i$ and $a_j$ of $$A = \begin{bmatrix} B_0 & 0 \\ 0 & B_1 \end{bmatrix},$$

where $0 \leq i, j \leq 2L-1$, i.e., $W_1 = [a_0 a_0^H, \ldots, a_0 a_{2L-1}^H\ a_1 a_0^H, \ldots, a_1 a_{2L-1}^H \ldots a_{2L-1} a_0^H, \ldots, a_{2L-1} a_{2L-1}^H]$, and where $W_2$ codebook is used to select $4L^2$ coefficient $$\{c_{i,j}\}_{i,j=0}^{2L-1}$$

as in the aforementioned embodiment 1, and construct $W_2$ as being a $8N_1N_2L^2 \times 1$ vector $W_2 = \text{kron}(c, e_{2N_1N_2})$, where kron (a, b) stands for the Kronecker product of column vectors a and b, $e_{2N_1N_2}$ is a $2N_1N_2 \times 1$ vector with entries being 1, and $c = [c_{0,0}, \ldots, c_{0,2L-1}\ c_{1,0}, \ldots, c_{1,2L-1} \ldots c_{2L-1,0}, \ldots, c_{2L-1,2L-1}]^T$ is the coefficient vector to combine outer products in $W_1$.

Figure 14:
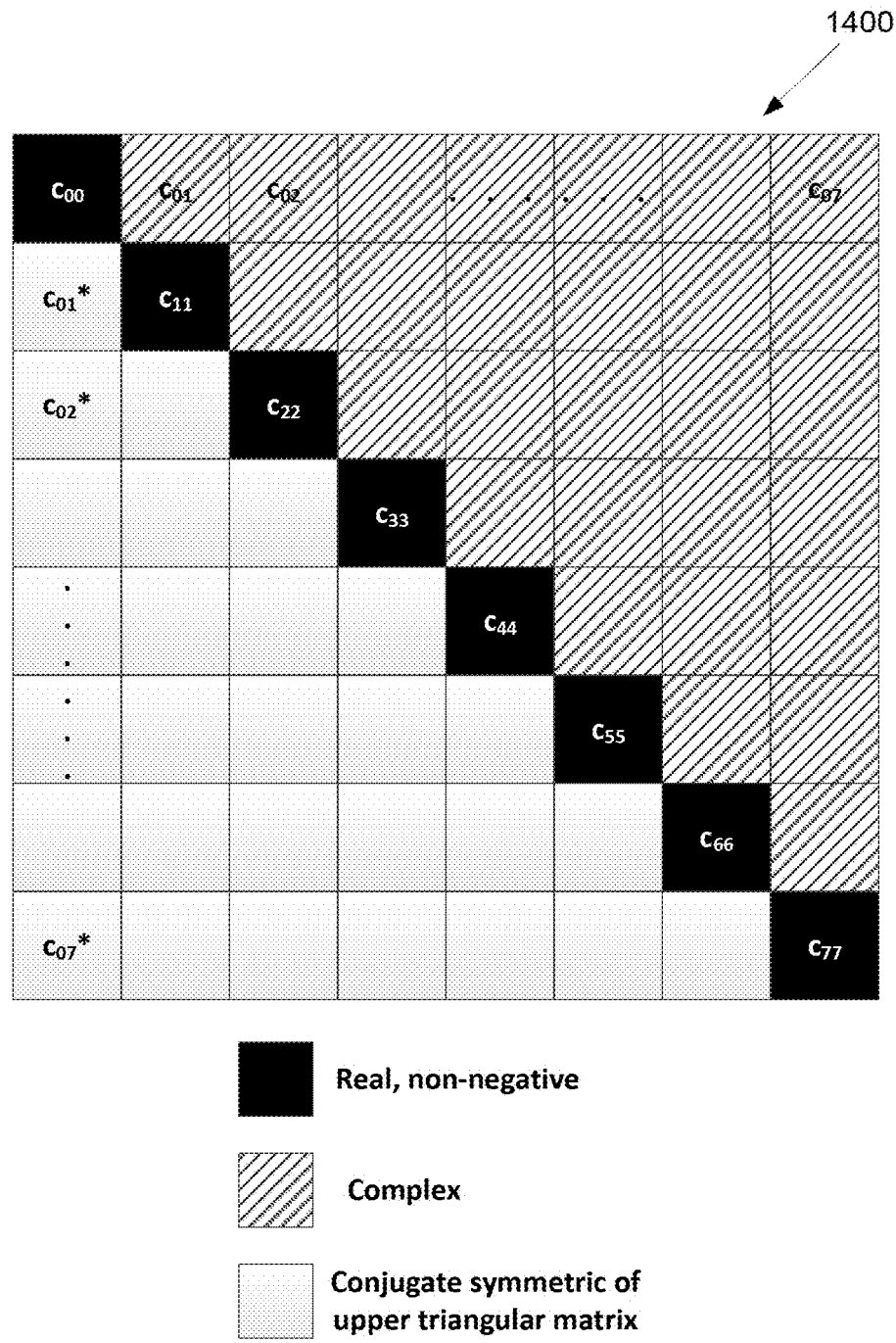
FIG. 14 illustrates an example full port covariance matrix according to embodiments of the present disclosure.

FIG. 14 illustrates an example full port covariance matrix 1400 according to embodiments of the present disclosure. The embodiment of the full port covariance matrix 1400 illustrated in FIG. 14 is for illustration only. FIG. 14 does not limit the scope of this disclosure to any particular implementation.

In some embodiments 2 (full port reporting), a UE is configured to report the full channel covariance matrix $$K = \frac{1}{|f|} \Sigma_{k \in f}((H_k)(H_k)^H),$$

where $H_k$ is the channel for subcarrier k and f is the set of all subcarriers over which the covariance matrix is computed, corresponding to all antenna ports in a single reporting instance as a beam combination of the outer products of L DFT vectors using the codebook (in the aforementioned embodiment 1) as illustrated in FIG. 14 for L=4 beams. The covariance matrix is represented as follows:

$$K \approx W_1 C W_1^H = \begin{bmatrix} B_0 & 0 \\ 0 & B_1 \end{bmatrix} C \begin{bmatrix} B_0 & 0 \\ 0 & B_1 \end{bmatrix}^H = \Sigma_{i=0}^{2L-1} \Sigma_{j=0}^{2L-1} c_{i,j} a_i a_j^H,$$

where $a_i$ and $a_j$ are i-th and j-th columns of $$W_1 = \begin{bmatrix} B_0 & 0 \\ 0 & B_1 \end{bmatrix},$$

and where $$a_i = \begin{bmatrix} b_{0,i} \\ 0 \end{bmatrix}$$

if $0 \leq i \leq L-1$ and $$a_i = \begin{bmatrix} 0 \\ b_{1,i} \end{bmatrix}$$

if $L \leq i \leq 2L-1$, and $$a_j = \begin{bmatrix} b_{0,j} \\ 0 \end{bmatrix}$$

if $0 \leq j \leq L-1$ and $$a_j = \begin{bmatrix} 0 \\ b_{1,j} \end{bmatrix}$$

if $L \leq j \leq 2L-1$.

Since Hermitian, the covariance matrix's diagonal elements, i.e., $\forall i=j$, $c_{i,j}$ are real non-negative, and the covariance matrix's non-diagonal elements, i.e., $\forall i \neq j$, $c_{i,j}$ are complex, and satisfy the conjugate symmetric property $c_{i,j} = c_{j,i}^*$. Therefore, in total, 2L real non-negative coefficients and (2L−1)L complex coefficients need to be reported.

In sub-embodiment of 2-0, the reporting of $B_0$, $B_1$, and C are determined according to at least one of the following alternatives/sub-alternatives. If multiple alternatives are supported, the multiple alternatives can configurable, for example via higher layer (RRC) or dynamic DCI signaling. In one example of Alt 2-0, $B_0$, $B_1$, and C are reported as a single PMI. In another example of Alt 2-1, $B_0$, and $B_1$ are reported as a $1^{st}$ PMI $i_1$, and C is reported as a $2^{nd}$ PMI $i_2$, where each of $1^{st}$ and $2^{nd}$ PMIs have exactly one component. In yet another example of Alt 2-2: $B_0$, and $B_1$ are reported as a $1^{st}$ PMI $i_1$, and C is reported as a $2^{nd}$ PMI $i_2$, where $1^{st}$ and $2^{nd}$ PMIs have multiple components. For instance, the $1^{st}$ PMI can have multiple components according to at least one of the following sub-alternatives.

In one instance of Alt 2-2-0, the $1^{st}$ PMI $i_{1,1}$ indicates $B_0$, and the $1^{st}$ PMI $i_{1,2}$ indicates $B_1$. In another instance of Alt 2-2-1, the $1^{st}$ PMI $i_{1,1}$ indicates $(L_1, L_2)$ basis set selection, common or different, for $B_0$ and $B_1$, and the $1^{st}$ PMI $i_{1,2}$ indicates L beam selection, common or different, for $B_0$ and $B_1$. In yet another instance of Alt 2-2-2, either Alt 2-2-0 or Alt 2-2-1 wherein the $1^{st}$ PMI $i_{1,3}$ indicates at least one strongest beam selection (which corresponds to the diagonal coefficient with the largest absolute value—more details are provided below in the sub-embodiment 2-1).

In yet another instance of Alt 2-2-3, either Alt 2-2-0 or Alt 2-2-1 wherein the $1^{st}$ PMI $i_{1,3}$ indicates relative beam power or relative amplitude if amplitude of coefficients are reported WB where reported beam power or amplitude corresponds to at least one of diagonal coefficients and non-diagonal coefficients.

In yet another instance of Alt 2-2-4, either Alt 2-2-0 or Alt 2-2-1 wherein the $1^{st}$ PMI $i_{1,3}$ indicates both at least one strongest beam selection and relative beam power.

In yet another instance of Alt 2-2-5, either Alt 2-2-0 or Alt 2-2-1 wherein the $1^{st}$ PMI $i_{1,3}$ and $i_{1,4}$ indicate at least one strongest beam selection and relative beam power or vice versa.

In yet another instance of Alt 2-2-6, any combination of Alt 2-2-0 to Alt 2-1-2 is supported.

In yet another instance of Alt 2-2-7, any of Alt 2-2-0 to Alt 2-2-6 in which at least one of $i_{1,1}, i_{1,2}, i_{1,3}$ and $i_{1,4}$ correspond to multiple sub-indices. For example, $i_{1,1}$, and $i_{1,2}$ correspond to two sub-indices $i_{1,1-1}$, and $i_{1,2-1}$, and $i_{1,1-2}$ and $i_{1,2-2}$, respectively.

Similarly, the $2^{nd}$ PMI can have multiple components according to at least one of the following sub-alternatives. In one example of Alt 2-2-8, the 2nd PMI $i_{2,1}$ and the 2nd PMI $i_{2,2}$ indicating WB and SB coefficients.

In another example of Alt 2-2-9, the $2^{nd}$ PMI $i_{2,1}$ indicates 2L diagonal coefficients, and the $2^{nd}$ PMI $i_{2,2}$ indicates (2L−1)L non-diagonal coefficients.

In yet another example of Alt 2-2-9, the $2^{nd}$ PMI $i_{2,1,1}$ and the $2^{nd}$ PMI $i_{2,1,2}$ indicate WB and SB diagonal coefficients, and the 2nd PMI $i_{2,2,1}$ and the $2^{nd}$ PMI $i_{2,2,2}$ indicate WB and SB non-diagonal coefficients.

In yet another example of Alt 2-2-10, the $2^{nd}$ PMI $i_{2,1}$ indicate 2L diagonal coefficients, and the 2nd PMI $i_{2,2}$ and the $3^{rd}$ PMI $i_{2,3}$ indicate amplitude and phase of (2L−1)L non-diagonal coefficients, respectively.

In yet another example of Alt 2-2-11, any combination of Alt 2-2-8 to Alt 2-1-11 is supported.

In yet another example of Alt 2-2-12, any of Alt 2-2-8 to Alt 2-2-11 in which at least one of the $2^{nd}$ PMI indices corresponds to multiple sub-indices.

In yet another example of Alt 2-2-13, $B_0 = B_1$ and the L vectors combined by the codebook are identified by the first PMI indices $i_{1,1}$ and $i_{1,2}$, where $$i_{1,1} = [q_1 \; q_2]$$
$$q_1 \in \{0, 1, \ldots, O_1 - 1\} \text{ and } i_{1,2} \in \left\{0, 1, \ldots, \binom{N_1 N_2}{L} - 1\right\}.$$
$$q_2 \in \{0, 1, \ldots, O_2 - 1\}$$

Let
$$n_1 = [n_1^{(0)}, \ldots, n_1^{(L-1)}]$$
$$n_2 = [n_2^{(0)}, \ldots, n_2^{(L-1)}]$$
$$n_1^{(i)} \in \{0, 1, \ldots, N_1 - 1\}$$
$$n_2^{(i)} \in \{0, 1, \ldots, N_2 - 1\}$$
and $C(x, y) = \begin{cases} \binom{x}{y} & x \geq y \\ 0 & x < y \end{cases}$ where the values of $C(x,y)$ are given in LTE specification.

The mapping of $n_1$ and $n_2$ to $i_{1,2}$ and vice versa can be according to the algorithm described in LTE specification. The indices $m_1^{(i)}$ and $m_2^{(i)}$ of the i-th vector $b_i = v_{m_1^{(i)}, m_2^{(i)}}$ are given by $$m_1^{(i)} = O_1 n_1^{(i)} + q_1$$
$$m_2^{(i)} = O_2 n_2^{(i)} + q_2$$

for i=0,1, . . . , L−1 where the quantity $v_{l,m}$ is given by $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1. \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The coefficient $c_{i,j}=a_{i,j}\beta_{i,j}$ where the amplitude coefficient indicators $i_{1,4}$ (if reported as a first PMI component) or $i_{2,2}$ (if reported as a second PMI component) is $i_{1,4}$ or $i_{2,2}=[k_{0,0}, k_{0,1}, \ldots, k_{0,2L-1}, \ldots, k_{2L-1,0}, k_{2L-1,1}, \ldots, k_{2L-1,2L-1}]$. The mapping from $k_{i,j}$ to the amplitude coefficient $a_{i,j}$ is given in TABLE 1. The amplitude coefficients are represented by $a=[a_{0,0}, a_{0,1}, \ldots, a_{0,2L-1}, \ldots, a_{2L-1,0}, a_{2L-1,1}, \ldots, a_{2L-1,2L-1}]$.

The phase coefficient indicators are $i_{2,1}=[\phi_{0,0}, \phi_{0,1}, \ldots, \phi_{0,2L-1}, \ldots, \phi_{2L-1,0}, \phi_{2L-1,1}, \ldots, \phi_{2L-1,2L-1}]$ where, $\beta_{i,j}=e^{j2\pi\phi_{i,j}/N_{PSK}}$ and the value of $N_{PSK}$ is configured with the higher layer parameter PhaseAlphabetSize, for example, where $N_{PSK}\in\{4,8\}$. Alternatively, $N_{PSK}$ is fixed, for example to 8. In addition, the values of $N_1$ and $N_2$ are configured with the higher-layer parameters CodebookConfig-N1 and CodebookConfig-N2, respectively. The supported configurations of $(N_1, N_2)$ for a given number of CSI-RS ports and the corresponding values of $(O_1, O_2)$ are given in LTE specification. The number of CSI-RS ports, $P_{CSI-RS}$, is $2N_1N_2$.

The value of L is configured with the higher layer parameter NumberOfBeams, where L=2 when $P_{CSI-RS}=4$ and $L\in\{2, 3, 4\}$ when $P_{CSI-RS}>4$. The UE is configured with the higher layer parameter SubbandAmplitude set to "ON" or "OFF." When SubbandAmplitude set to 'ON', then the SB amplitude coefficient, $b_1$, is also reported in addition to the WB amplitude $a_{i,j}$. An example of SB amplitude codebook is shown in TABLE 2.

Note that in this case, the amplitude coefficient is given by $a_{i,j}b_{i,j}$. The SB amplitude indicator is given by the amplitude coefficient indicators $i_{2,2}{}^2$, which is a second PMI component.

TABLE 1

Mapping of elements of $i_{1,4}$ or $i_{2,2}:k_{i,j}$ to $a_{i,j}$

| $k_{i,j}$ | $a_{i,j}$ |
| --- | --- |
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 2

Mapping of elements of $i_{2,2}{}^2: k_{i,j}{}^{(2)}$ to $b_{i,j}$

| $k_{i,j}{}^{(2)}$ | $b_{i,j}$ |
| --- | --- |
| 0 | $\sqrt{1/2}$ |
| 1 | 1 |

In sub-embodiment of 2-1, the strongest coefficient, i.e., the coefficient with the maximum absolute value, can also be reported. In an example, the strongest coefficient corresponds to any one of the 2L diagonal elements. The rest of 2L−1 diagonal coefficients and (2L−1)L non-diagonal coefficients are normalized by the absolute value of the strongest coefficient, and normalized coefficients are reported. Because of this normalization, the amplitude of all coefficients is between 0 and 1. The strongest coefficient reporting is determined according to at least one of the following alternatives.

In one example of Alt 2-3, the strongest coefficient is reported WB. It is either reported jointly or separately with the $1^{st}$ PMI and hence can be considered a part of $W_1$ codebook/reporting, e.g. as the first PMI index $i_{1,3}$, or reported jointly or separately with the $2^{nd}$ PMI as a WB component of $W_2$ codebook/reporting. Alternatively, the strongest coefficient is reported with RI.

In one example of Alt 2-4, the strongest coefficient is reported SB. It is reported jointly or separately with the $2^{nd}$ PMI as a SB component of $W_2$ codebook/reporting.

In one example of Alt 2-5, the strongest coefficient reporting is configured to be either WB or SB. This configuration is either via higher layer RRC or more dynamic DCI signaling.

In one instance, one strongest coefficient, common for two polarizations, is reported. The two diagonal coefficients corresponding to the strongest beam are set to 1. This is applicable to $W_1$ codebook according to Alt 1-0 and requires $[\log_2 L]$ bit indication. In another instance, the strongest coefficient corresponds to one of the two polarizations. This requires $[\log_2 2L]$ bit indication. In yet another alternative, two strongest coefficients corresponding to two polarizations are reported which requires $[\log_2 2L]$ bit indication.

The absolute value of the strongest coefficient may also be reported. If reported, a gNB can scale the covariance matrix by the reported value. This reporting can be configurable via higher layer RRC or dynamic DCI signaling.

In sub-embodiment of 2-2, the coefficient reporting is determined according to at least one of the following alternatives.

In one example of Alt 2-6, only diagonal coefficients are reported, and the non-diagonal coefficients are approximated as $c_{i,j}=a_{i,j}\sqrt{c_{i,i}c_{j,j}}$, where i≠j, $\alpha_{i,j}$ is a scaling parameter which can be fixed, estimated, or reported, and $c_{i,i}$ and $c_{j,j}$ are reported diagonal coefficients. Note that the non-diagonal coefficients can be is real or imaginary depending on whether scaling $\alpha_{i,j}$ is real or imaginary.

In one example of Alt 2-7, only diagonal coefficients and phase of non-diagonal coefficients are reported, and the non-diagonal coefficients are approximated as $c_{i,j}=\alpha_{i,j}\sqrt{c_{i,i}c_{j,j}}\phi_{i,j}$, where i≠j, $\alpha_{i,j}$ is a scaling parameter which can be fixed, estimated, or reported, and $c_{i,i}$ and $c_{j,j}$ are reported diagonal coefficients, and $\phi_{i,j}$ is the reported phase of non-diagonal coefficient. Note that the scaling $\alpha_{i,j}$ is real in this alternative. In one example, a single common scaling $\alpha_{i,j}=\alpha$ is reported for all i≠j.

In one example of Alt 2-8, all diagonal coefficients, and phase and amplitude of all non-diagonal coefficients are reported.

For the aforementioned examples Alt 2-6 and 2-7, scaling can be common for all non-diagonal coefficients, or different for each or for a subset of non-diagonal coefficients. Either one of the aforementioned examples Alt 2-6, Alt 2-7, or Alt 2-8 is fixed or configured via higher layer RRC or dynamic DCI signalling.

In sub-embodiment of 2-3, the amplitude reporting bits for diagonal and non-diagonal coefficients are the same, e.g., $N_{diag}=N_{nondiag}=2$ or 3 bits. Alternatively, the amplitude reporting bits are different, e.g., $N_{diag}=2$ or 3 bits and $N_{nondiag}=1$ or 2 bits. One of the two alternatives is fixed or configured via higher layer RRC or dynamic DCI signalling.

In sub-embodiment of 2-4, the phase quantization codebook (for non-diagonal coefficients) is QPSK or 8PSK, where one of them is fixed or configured via higher layer RRC or dynamic DCI signalling.

The amplitude quantization codebook is determined according to at least one of the following alternatives.

In one example of Alt 2-9, the amplitudes of diagonal and non-diagonal coefficients are reported independently using a common or two respective amplitude quantization codebooks.

In one example of Alt 2-10, the amplitudes of non-diagonal coefficients are reported depending on that of diagonal coefficients since $|c_{i,j}|^2 \leq c_{i,i} c_{j,j}$. A few examples are as follows. In one instance of example 2-10-0, the difference $d_{i,j}=c_{i,i}c_{j,j}-|c_{i,j}|^2$ or $\sqrt{c_{i,i}c_{j,j}}-|c_{i,j}|$ is reported for (i, j) non-diagonal coefficient, where $c_{i,i}$ and $c_{j,j}$ are reported amplitudes of diagonal coefficients (i, i) and (i, j), respectively, and $c_{i,j}$ is un-quantized amplitude of (i,j) non-diagonal coefficient. The reconstructed amplitude of (i, j) non-diagonal coefficient is $\sqrt{c_{i,i}c_{j,j}-d_{i,j}}$ or $\sqrt{c_{i,i}c_{j,j}}-d_{i,j}$, respectively for the two types of differences.

In another instance of example 2-10-1, the ratio is reported $$d_{i,j} = \frac{|c_{i,j}|^2}{c_{i,i}c_{j,j}} \text{ or } \frac{|c_{i,j}|}{\sqrt{c_{i,i}c_{j,j}}}$$

is reported. The reconstructed amplitude of (i, j) non-diagonal coefficient is $\sqrt{c_{i,i}c_{j,j}d_{i,j}}$ or $d_{i,j}\sqrt{c_{i,i}c_{j,j}}$, respectively for the two types of ratios.

In yet another instance of example 2-10-2, the codebook to report amplitude of (i, j) non-diagonal coefficient is a function of $c_{i,i}c_{j,j}$ or $\sqrt{c_{i,i}d_{j,j}}$, where the function corresponds to at least one of multiplication by, division by, or subtraction from/to $c_{i,i}c_{j,j}$ or $\sqrt{c_{i,i}c_{j,j}}$.

One of amplitude quantization codebook is fixed or configured via higher layer RRC or dynamic DCI signalling. The amplitude quantization codebook is determined according to at least one of the following:

$$C_{A,0} = \left\{ \frac{1}{\sqrt{2^i}} : i = 0, 1, 2, ..., N_A - 1 \right\}; \text{ and}$$

$$C_{A,1} = \{0\} \cup \left\{ \frac{1}{\sqrt{2^i}} : i = 0, 1, 2, ..., N_A - 2 \right\}$$

where $N_A$ is the number of bits to quantize each amplitude. For example, if $N_A=2$, then $C_{A,0}=\{1, \sqrt{0.5}, \sqrt{0.25}, \sqrt{0.125}\}$ and $C_{A,1}=\{1, \sqrt{0.5}, \sqrt{0.25}, 0\}$, and if $N_A=3$, then $C_{A,0}=\{1, \sqrt{0.5}, \sqrt{0.25}, \sqrt{0.125}, \sqrt{0.0625}, \sqrt{0.0313}, \sqrt{0.0156}, \sqrt{0.0078}\}$ and $C_{A,1}=\{1, \sqrt{0.5}, \sqrt{0.25}, \sqrt{0.125}, \sqrt{0.0625}, \sqrt{0.0313}, \sqrt{0.0156}, 0\}$.

Figure 15:
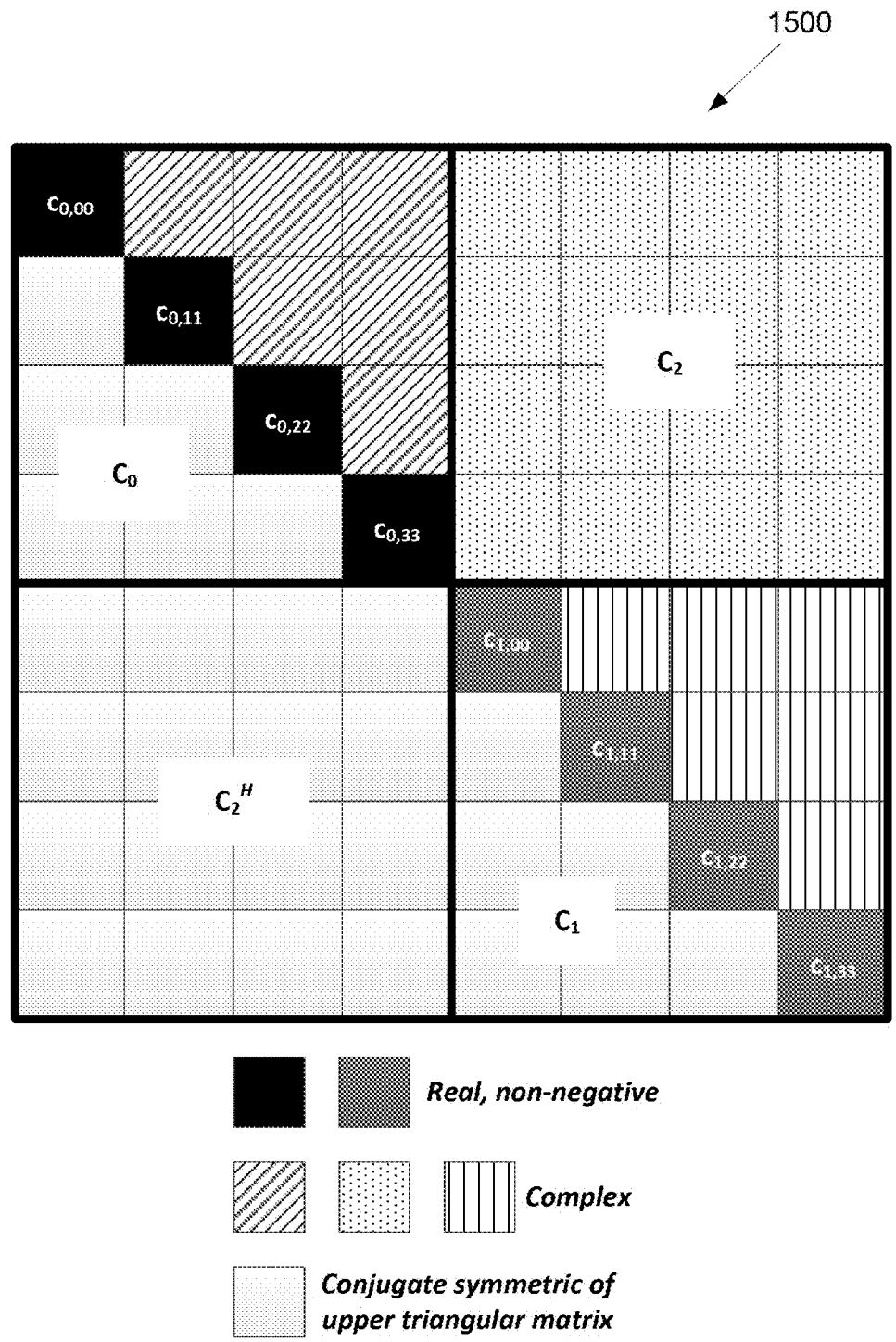
FIG. 15 illustrates an example partial port covariance matrix according to embodiments of the present disclosure.

FIG. 15 illustrates an example partial port covariance matrix 1500 according to embodiments of the present disclosure. The embodiment of the partial port covariance matrix 1500 illustrated in FIG. 15 is for illustration only. FIG. 15 does not limit the scope of this disclosure to any particular implementation.

In some embodiment 3 (partial port reporting), a UE is configured to report the two diagonal blocks (for two polarizations) and one non-diagonal block (for cross polarizations) of the channel covariance matrix K in at least one reporting instance as a beam combination of the outer products of L DFT vectors using the codebook (in the aforementioned embodiment 1). This is illustrated in FIG. 15 for L=4 beams. The covariance matrix is represented as given by:

$$K \approx W_1 C W_1^H = \begin{bmatrix} B_0 & 0 \\ 0 & B_1 \end{bmatrix} \begin{bmatrix} C_0 & C_2 \\ C_2^H & C_1 \end{bmatrix} \begin{bmatrix} B_0 & 0 \\ 0 & B_1 \end{bmatrix}^H = \begin{bmatrix} B_0 C_0 B_0^H & B_0 C_2 B_1^H \\ B_1 C_2^H B_0^H & B_1 C_1 B_1^H \end{bmatrix}$$

where the two diagonal and one non-diagonal blocks are as follows: $B_0 C_0 B_0^H = \sum_{i=0}^{L-1} \sum_{j=0}^{L-1} c_{0,i,j} b_{0,i} b_{0,j}^H$; $B_1 C_1 B_1^H = \sum_{i=0}^{L-1} \sum_{j=0}^{L-1} c_{1,i,j} b_{1,i} b_{1,j}^H$; and $B_0 C_2 B_1^H = \sum_{i=0}^{L-1} \sum_{j=0}^{L-1} c_{2,i,j} b_{0,i} b_{1,j}^H$.

It is sufficient to report $C_0$, $C_1$ and $C_2$, and the $C_0$, $C_1$ and $C_2$ are reported in three reporting instances: since $C_0$ and $C_1$ are Hermitian matrices, it is sufficient to report their 2L real non-negative coefficients (diagonal elements) and (L−1)L complex coefficients (non-diagonal elements); and since $C_2$ is non-Hermitian, the $C_2$'s elements are complex and all $L^2$ elements need to be reported. Therefore, in total, 2L real non-negative coefficients and (2L−1)L complex coefficients need to be reported.

In sub-embodiment of 3-0, the reporting of three coefficient matrices is determined according to at least one of the following alternatives. In one example of Alt 3-0, 1 reporting instance is used to report all three coefficient matrices.

In one example of Alt 3-1, 2 reporting instances are used to report according to at least one of the following sub-alternatives. In one instance of Alt 3-1-0, 2L diagonal coefficients are reported in the $1^{st}$ reporting instance, and (2L−1)L non-diagonal coefficients are reported in the $2^{nd}$ reporting instance. In another instance of Alt 3-1-1, 2L real non-negative coefficients and amplitude of non-diagonal coefficients are reported in the $1^{st}$ reporting instance, and phase of non-diagonal coefficients are reported in the $2^{nd}$ reporting instance. In yet another instance of Alt 3-1-2, upper triangular coefficients of $C_0$ are reported in the $1^{st}$ reporting instance, and upper triangular coefficients of $C_1$ and all coefficients of $C_2$ are reported in the $2^{nd}$ reporting instance. In yet another of Alt 3-1-3, upper triangular coefficients of $C_1$ are reported in the $1^{st}$ reporting instance, and upper triangular coefficients of $C_0$ and all coefficients of $C_2$ are reported in the $2^{nd}$ reporting instance. In yet another instance of Alt 3-1-4, all coefficients of $C_2$ are reported in the $1^{st}$ reporting instance, and upper triangular coefficients of $C_0$ and $C_1$ are reported in the $2^{nd}$ reporting instance.

In one example of Alt 3-2, 3 reporting instances are used according to at least one of the following sub-alternatives. In one instance of Alt 3-2-0: $C_0$, $C_1$ and $C_2$ are reported in the $1^{st}$, $2^{nd}$, and $3^{rd}$ reporting instances respectively. In another instance of Alt 3-2-1, 2L real non-negative coefficients are reported in the $1^{st}$ reporting instance, amplitude of non-diagonal coefficients are reported in the $2^{nd}$ reporting instance, phase of non-diagonal coefficients are reported in the $3^{rd}$ reporting instance.

The reporting of basis sets $B_0$ and $B_1$ is either separate from the reporting of three coefficients matrices. Alternatively, it is together with one of the at least one reporting instances for the coefficient matrices. One of these alternatives is either fixed or configured via higher layer RRC or dynamic DCI signalling.

In sub-embodiment of 3-1, a single strongest coefficient is reported in one of the reports which is common for all reports. Or, a single strongest coefficient is reported in each report. In case of the former, the CSI reporting instance in which the strongest coefficient is reported is either fixed or configured via higher layer RRC or dynamic DCI signalling. All other sub-embodiments of embodiment 1 are applicable to the aforementioned embodiment 2.

Figure 16:
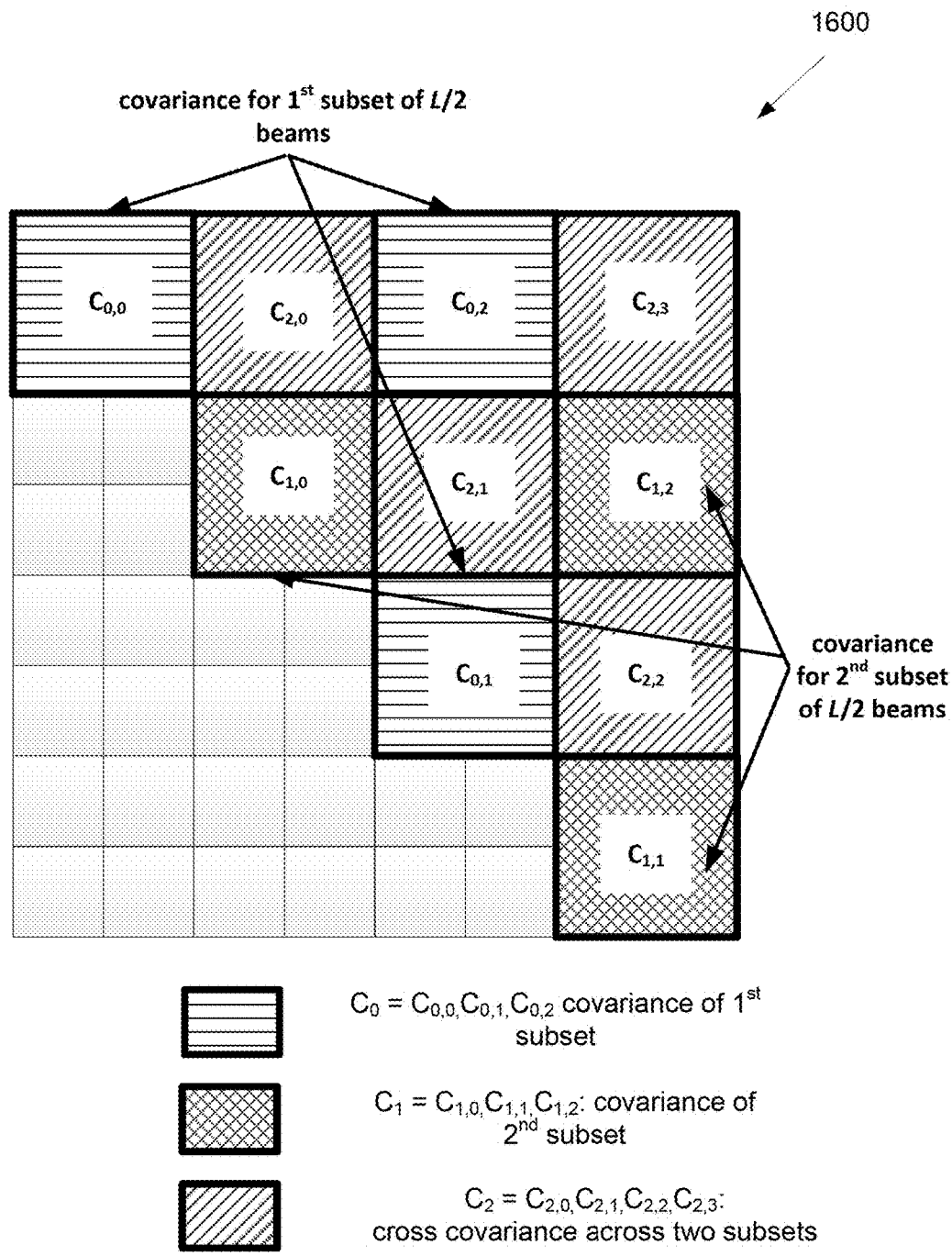
FIG. 16 illustrates an example differential covariance matrix according to embodiments of the present disclosure.

FIG. 16 illustrates an example differential covariance matrix 1600 according to embodiments of the present disclosure. The embodiment of the differential covariance matrix 1600 illustrated in FIG. 16 is for illustration only. FIG. 16 does not limit the scope of this disclosure to any particular implementation.

In some embodiment 4 (partial port reporting): a UE is configured to report the channel covariance matrix K in at least one reporting instance as a beam combination of the outer products of a subset (comprising of L'<L DFT vectors) of L DFT vectors using the codebook (in Embodiment 1) where L' divides L. This is illustrated in FIG. 16 for L'=2 and L=4. Assuming $$L' = \frac{L}{2},$$

The covariance matrix is represented as follows.

$$K \approx W_1 C W_1^H = \begin{bmatrix} B_{0,0} & 0 & 0 & 0 \\ 0 & B_{0,1} & 0 & 0 \\ 0 & 0 & B_{1,0} & 0 \\ 0 & 0 & 0 & B_{1,1} \end{bmatrix}$$

$$\begin{bmatrix} C_{0,0} & D_0 & C_{2,0} & D_3 \\ D_0^H & C_{0,1} & D_1 & C_{2,1} \\ C_{2,0}^H & D_1^H & C_{1,0} & D_2 \\ D_3^H & C_{2,1}^H & D_2^H & C_{1,1} \end{bmatrix} \begin{bmatrix} B_{0,0} & 0 & 0 & 0 \\ 0 & B_{0,1} & 0 & 0 \\ 0 & 0 & B_{1,0} & 0 \\ 0 & 0 & 0 & B_{1,1} \end{bmatrix}^H =$$

$$\begin{bmatrix} B_{0,0} C_{0,0} B_{0,0}^H & B_{0,0} D_0 B_{0,1}^H & B_{0,0} C_{2,0} B_{1,0}^H & B_{0,0} D_3 B_{1,1}^H \\ B_{0,1} D_0^H B_{0,0}^H & B_{0,1} C_{0,1} B_{0,1}^H & B_{0,1} D_1 B_{1,0}^H & B_{0,1} C_{2,1} B_{1,1}^H \\ B_{1,0} C_{2,0}^H B_{0,0}^H & B_{1,0} D_1^H B_{0,1}^H & B_{1,0} C_{1,0} B_{1,0}^H & B_{1,0} D_2 B_{1,1}^H \\ B_{1,1} D_3^H B_{0,0}^H & B_{1,1} C_{2,1}^H B_{0,1}^H & B_{1,1} D_2^H B_{1,0}^H & B_{1,1} C_{1,1} B_{1,1}^H \end{bmatrix},$$

where there are four diagonal blocks and six non-diagonal blocks. As shown in FIG. 16, two diagonal ($C_{0,0}$, $C_{0,1}$) and one non-diagonal ($C_{0,2}$) blocks correspond to the covariance matrix Co using a first subset of L/2 beams, two diagonal ($C_{1,0}$, $C_{1,1}$) and one non-diagonal ($C_{1,2}$) blocks correspond to the covariance matrix $C_1$ using a second subset of L/2 beams, where two subsets of beams are distinct, and four non-diagonal blocks ($C_{2,0}$, $C_{2,1}$, $C_{2,2}$, $C_{2,3}$) correspond to the cross covariance $C_2$ across two subsets.

The reporting alternatives of basis sets, $B_0$ and $B_1$, and coefficient matrices $C_0$, $C_1$, and $C_2$ are according to one of the alternatives in Embodiment 2 and/or 3.

In some embodiment 5 (partial port reporting): a UE is configured to report the channel covariance matrix K in at least one reporting instance as a beam combination of the outer products of K subsets (subset k=0, ..., K−1 comprising of $L'_k<L$ DFT vectors) of L DFT vectors using the codebook (in Embodiment 1), where subsets don't have any common DFT vector, and $\Sigma_k L'_k=L$. Note that $L'_k$ may or may not divide L and number of DFT beams in K subsets ($L'_k$ value) may or may not be the same. Similar to Embodiment 4, the covariance matrix can be represented as 2K×2K block diagonal matrices where each block corresponds to a linear combination of outer products of beam pairs. Following the construction in FIG. 16, covariance matrices $C_0$, $C_1$, ..., $C_{K-1}$ for K subsets and cross covariance matrices $C_K$, ..., $C_{K+A-1}$ for $$A = \binom{K}{2}$$

subset pairs out of K subsets can be constructed.

The reporting alternatives of basis sets, $B_0$ and $B_1$, and coefficient matrices $C_0, C_1, \ldots, C_{K+A-1}$ are according to one of the alternatives in Embodiment 2 and/or 3.

In some embodiments 6, a UE is configured with $W_1 W_2$ codebook to report covariance matrix for multiple antenna panels (FIG. 11) with M≥1 panels, which has a block diagonal structure with 2M blocks. The $W_1$ codebook is a 2M×2M block diagonal matrix in which the first 2 consecutive blocks from the top-left corner are associated with the two polarizations of the $1^{st}$ antenna panel, the next 2 consecutive blocks are associated with the two polarizations of the $2^{nd}$ antenna panel, and so on. In one example of M=2 antenna panels, the $W_1$ codebook is determined according to one of the following alternatives.

In one instance of Alt 6-0, $$W_1 = \begin{bmatrix} B_0 & 0 & 0 & 0 \\ 0 & B_1 & 0 & 0 \\ 0 & 0 & B_0 & 0 \\ 0 & 0 & 0 & B_1 \end{bmatrix},$$

$B_0$ and $B_1$ are basis sets, which are common for the two panels. Such a basis can be configured if port layouts of both panels are identical.

In another instance of Alt 6-1, $$W_1 = \begin{bmatrix} B_{0,0} & 0 & 0 & 0 \\ 0 & B_{0,1} & 0 & 0 \\ 0 & 0 & B_{1,0} & 0 \\ 0 & 0 & 0 & B_{1,1} \end{bmatrix},$$

$B_{0,0}$ and $B_{0,1}$ are basis sets for panel 0, and $B_{1,0}$ and $B_{1,1}$ are basis sets for panel 1. Such a basis can be configured if port layouts of the two panels are different. It is straightforward to extend this example to more than 2 antenna panels. In one sub-embodiment, a single covariance matrix of size $2N_1N_2 \times 2N_1N_2$ is reported, which is common for all panels. The reporting of the covariance matrix is determined according to some embodiments of the present disclosure.

In another sub-embodiment, a covariance matrix of size $2N_1N_2 \times 2N_1N_2$ is reported for each panel according to at least one of the following alternatives. In one instance of Alt 6-2, $W_1$ and $W_2$ are reported independently for each panel according to some embodiments of the present disclosure. In another instance of Alt 6-3, a common $W_1$ (as shown in Alt 6-0) is reported for all panels according to some embodiments of the present disclosure, and $W_2$ is reported independently for each panel according to some embodiments of the present disclosure. In yet another instance of Alt 6-4, a common basis set of size ($L_1$, $L_2$) (cf. Embodiment 1) is reported for all panels, L out of $L_1L_2$ beam selection is reported independently for each panel, and $W_2$ is reported independently for each panel according to some embodiments of the present disclosure.

In another sub-embodiment, for each of Alt 6-2, 6-3, and 6-4, the strongest coefficient (cf. sub-embodiment 2-1) is reported either for each panel or common for all panels. In another sub-embodiment, a UE is configured with the partial (cf. embodiment 3) or differential covariance matrix reporting (cf embodiments 4 and 5) in which partial or differential is considered across panels. For example, FIG. 15 is an example of partial covariance matrix reporting in which antenna ports in panel 0 correspond to one set of partial ports and antenna ports in panel 1 correspond to another set of partial ports. Similarly, FIG. 16 is an example of differential covariance matrix reporting in which a subset of L/2 beams are used to report the covariance matrix for the two panels, and another subset of L/2 beams are used to report the covariance matrix for the same two panels in one or multiple reporting instances.

In one embodiment A, a UE is configured to report full or partial (e.g. diagonal coefficients only, Alt 2-6 in embodiment 2) covariance matrix of at least one of DL channel and DL interference according to some embodiments of the present disclosure. In one example, the UE is configured to report both channel and interference covariance matrices where each of the two covariance matrices can be either full or partial covariance matrix. In another example, the UE is configured to report full or partial interference covariance matrix.

In another embodiment B, a UE is configured to report an approximation of the covariance matrix as $\tilde{K} \approx \Sigma_{i=0}^{2L-1} c_i a_i a_i^H + \Delta$, where $a_i$ is a column of $$W_1 = \begin{bmatrix} B_0 & 0 \\ 0 & B_1 \end{bmatrix}$$

as defined in embodiment 2, $c_i$ is the coefficient corresponding to the outer product $a_i a_i^H$ of the i-th column $a_i$ of $W_1$, and $\Delta$ is a matrix to approximate the residual covariance, i.e., $\Delta$ approximates $\tilde{K} - \Sigma_{i=0}^{2L-1} c_i a_i a_i^H$. The coefficients $\{c_i\}$ are real non-negative. Or, the coefficients $\{c_i\}$ are complex.

The UE reports $B_0$ and $B_0$ as $W_1$ (according to some embodiments of the present disclosure), $\{c_i\}$ and $\Delta$ as $W_2$ (according to some embodiments of the present disclosure), where the residual covariance $\Delta$ is reported according to at least one of the following alternative. In one example of Alt B-0, $\Delta$ is fixed (e.g. 0), hence not reported. In another example of Alt B-1, $\Delta = c_{2L} I_{2N}$, where $c_{2L}$ is real non-negative and $I_{2N}$ is an identity matrix, hence only $c_{2L}$ is reported. This corresponds to a reduced-rank approximation of the covariance matrix K appended by a scaled identity matrix. The codebook to report $c_{2L}$ can be the same as that to report $\{c_i\}$. Alternatively, $c_{2L}$ is reported using another codebook. In yet another example of Alt B-2, $\Delta = c_{2L} \Sigma_{i=0}^{2L-1} \Sigma_{j=0, j \neq i}^{2L-1} a_i a_j^H$, where either: $c_{2L}$ is real non-negative, and is reported as in Alt B-1; or $c_{2L}$ belongs to $2^N$-PSK alphabet, where N=2, 3, or 4, or $c_{2L} = m\phi$, where m is real non-negative, and is reported as in Alt B-1, and $\phi$ belongs to $2^N$-PSK alphabet, where N=2, 3, or 4.

Figure 17:
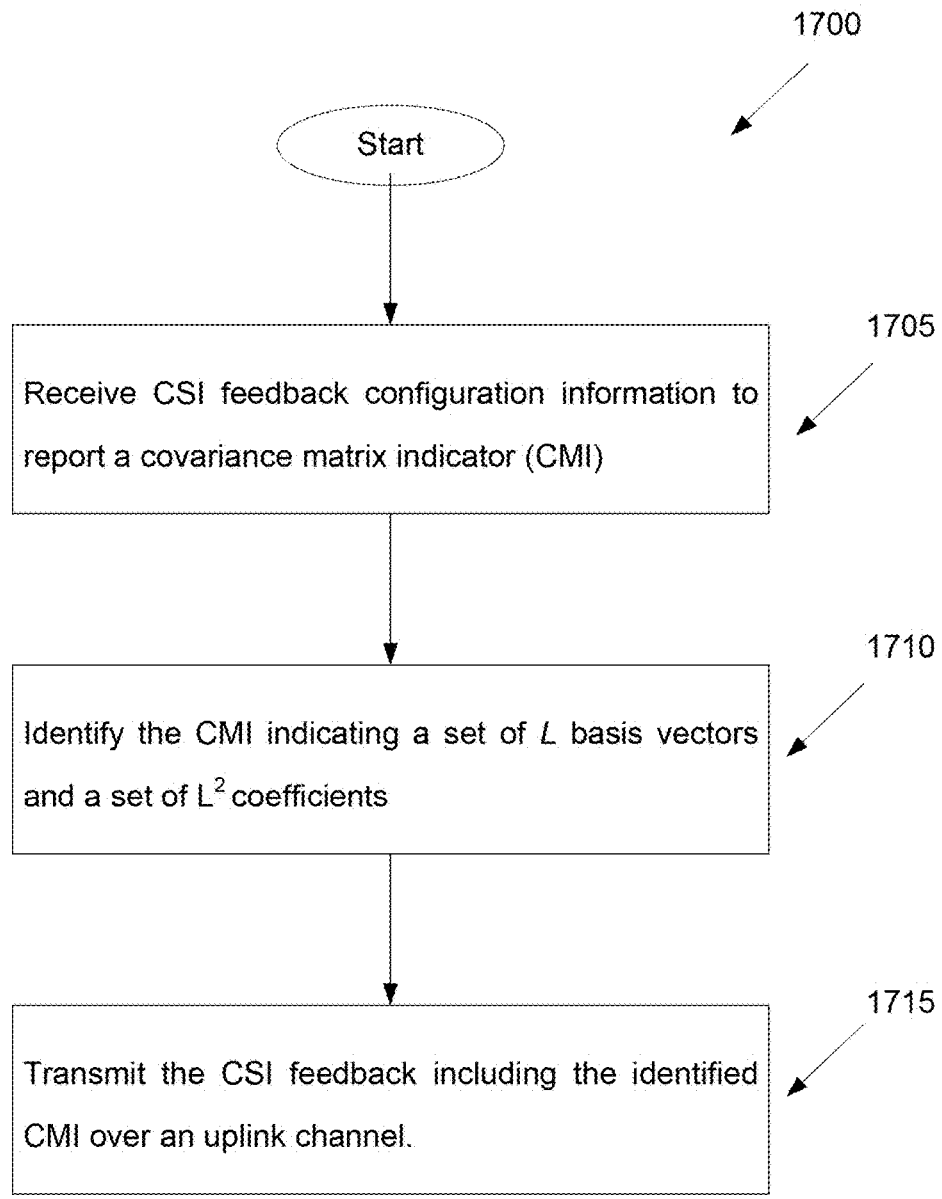
FIG. 17 illustrates a flow chart of a method for CSI feedback according to embodiments of the present disclosure.

FIG. 17 illustrates a flow chart of a method 1700 for, may be performed by a user equipment (UE), according to embodiments of the present disclosure. The embodiment of the method 1700 illustrated in FIG. 17 is for illustration only. FIG. 17 does not limit the scope of this disclosure to any particular implementation.

As shown in FIG. 17, the method 1700 for CSI feedback begins at step 1705. At step 1705, the UE receives, by the UE from a base station (BS), CSI feedback configuration information to report a covariance matrix indicator (CMI) indicating a N×N channel covariance matrix (K) associated with a downlink channel matrix, wherein N is a number of antenna ports at the BS.

In some embodiments, $\tilde{K} = W_1 W_2 W_1^H = \Sigma_{i=0}^{L-1} \Sigma_{j=0}^{L-1} c_{i,j} a_i a_j^H$, $W_1 = [a_0 \ a_1 \ \ldots \ a_{L-1}]$ is a N×L basis matrix whose columns correspond to the L basis vectors, and $W_2 = C$ is a L×L Hermitian matrix whose (i,j)-th entry is a coefficient $c_{i,j}$.

In some embodiments, $N = 2N_1 N_2$ antenna ports at the BS are dual-polarized into two polarizations (polarization 0 and polarization 1), each with $N_1 N_2$ antenna ports, where $N_1$ and $N_2$ are the number of antenna ports in a first and a second dimensions, respectively, $$L = 2L', \ \tilde{K} = W_1 W_2 W_1^H = \begin{bmatrix} B_0 & 0 \\ 0 & B_1 \end{bmatrix} C \begin{bmatrix} B_0 & 0 \\ 0 & B_1 \end{bmatrix}^H = \Sigma_{i=0}^{2L'-1} \Sigma_{j=0}^{2L'-1} c_{i,j} a_i a_j^H,$$

$a_i$ is an i-th column of $$W_1 = \begin{bmatrix} B_0 & 0 \\ 0 & B_1 \end{bmatrix}$$

such that $$a_i = \begin{bmatrix} a_{0,i} \\ 0 \end{bmatrix}$$

if $0 \leq i \leq L'-1$ and $$a_i = \begin{bmatrix} 0 \\ a_{1,i} \end{bmatrix}$$

if $L' \leq i \leq 2L'-1$, $B_0 = [a_{0,0} \ a_{0,1} \ \ldots \ a_{0,L'-1}]$ and $B_1 = [a_{1,0} \ a_{1,1} \ \ldots \ a_{1,L'-1}]$ respectively are $N_1 N_2 \times L'$ basis matrices whose columns correspond to basis vectors for the two polarizations, and $W_2 = C$ is a 2L'×2L' Hermitian matrix whose (i,j)-th entry is a coefficient $c_{i,j}$.

In such embodiments, the basis matrices are common for the two polarizations such that $B_0 = B_1$. In such embodiments, amplitude and phase of combining coefficients $\{c_{i,j}\}$ are reported separately in a wideband (WB) manner such that for each (i, j) pair, a single amplitude coefficient and a single phase coefficient are reported for an entire CSI reporting band.

In such embodiments, the set of $L^2$ coefficients form a L×L Hermitian matrix C whose (i,j)-th and (j,i)-th entries are conjugates of each other such that $c_{i,j} = c_{j,i}^*$ and only one of an upper triangle ($\{c_{i,j}\}$ such that i≥j) or a lower triangle ($\{c_{i,j}\}$ such that i≤j) of the coefficient matrix C is reported using the CMI.

Subsequently, the UE at step 1710 identifies, by the UE, the CMI that indicates a set of L basis vectors $\{a_i\}$, i=0, 1, 2, ..., L-1, each comprising a dimension N×1, and a set of $L^2$ coefficients, $\{c_{i,j}\}$, i,j=0, 1, 2, ..., L-1, and that represent the covariance matrix (K) as a weighted linear sum $\tilde{K}=\Sigma_{i=0}^{L-1}\Sigma_{j=0}^{L-1}c_{i,j}a_ia_j^H$, wherein L≤N and $^H$ denotes a Hermitian transpose.

Finally, the UE at step 1715 transmits, by the UE to the BS, the CSI feedback including the identified CMI over an uplink channel.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) feedback, the UE comprising:
    a transceiver configured to receive, from a base station (BS), CSI feedback configuration information to report a covariance matrix indicator (CMI) indicating a N×N channel covariance matrix (K) associated with a downlink channel matrix, wherein N is a number of antenna ports at the BS; and
    a processor operably connected to the transceiver, the processor configured to identify the CMI that indicates a set of L basis vectors $\{a_i\}$, i=0, 1, 2, . . . , L−1, each comprising a dimension N×1, and a set of $L^2$ coefficients, $\{c_{i,j}\}$, i,j=0, 1, 2, . . . , L−1, and that represent the covariance matrix (K) as a weighted linear sum $\tilde{K}=\Sigma_{i=0}^{L-1}\Sigma_{j=0}^{L-1}c_{i,j}a_ia_j^H$, wherein L≤N and $^H$ denotes a Hermitian transpose,
    wherein the transceiver is further configured to transmit, to the BS, the CSI feedback including the identified CMI over an uplink channel.

2. The UE of claim 1, wherein:

$$\tilde{K}=W_1W_2W_1^H=\Sigma_{i=0}^{L-1}\Sigma_{j=0}^{L-1}c_{i,j}a_ia_j^H,$$

$W_1=[a_0\ a_1\ \ldots\ a_{L-1}]$ is a N×L basis matrix whose columns correspond to the L basis vectors, and
$W_2=C$ is a L×L Hermitian matrix whose (i,j)-th entry is a coefficient $c_{i,j}$.

3. The UE of claim 1, wherein:
$N=2N_1N_2$ antenna ports at the BS are dual-polarized into two polarizations (polarization 0 and polarization 1), each with $N_1N_2$ antenna ports, where $N_1$ and $N_2$ are the number of antenna ports in a first and a second dimensions, respectively, $$L=2L',$$

$$\tilde{K}=W_1W_2W_1^H=\begin{bmatrix}B_0 & 0 \\ 0 & B_1\end{bmatrix}C\begin{bmatrix}B_0 & 0 \\ 0 & B_1\end{bmatrix}^H=\Sigma_{i=0}^{2L'-1}\Sigma_{j=0}^{2L'-1}c_{i,j}a_ia_j^H,$$

$a_i$ is an i-th column of $$W_1=\begin{bmatrix}B_0 & 0 \\ 0 & B_1\end{bmatrix}$$

such that $$a_i=\begin{bmatrix}a_{0,i} \\ 0\end{bmatrix}$$

if 0≤i≤L'−1 and $$a_i=\begin{bmatrix}0 \\ a_{1,i}\end{bmatrix}$$

if L'≤i≤2L'−1,
    $B_0=[a_{0,0}\ a_{0,1}\ \ldots\ a_{0,L'-1}]$ and $B_1=[a_{1,0}\ a_{1,1}\ \ldots\ a_{1,L'-1}]$ respectively are $N_1N_2\times L'$ basis matrices whose columns correspond to basis vectors for the two polarizations, and
    $W_2=C$ is a 2L'×2L' Hermitian matrix whose (i,j)-th entry is a coefficient $c_{i,j}$.

4. The UE of claim 3, wherein the basis matrices are common for the two polarizations such that $B_0=B_1$.

5. The UE of claim 1, wherein amplitude and phase of combining coefficients $\{c_{i,j}\}$ are reported separately in a wideband (WB) manner such that for each (i,j) pair, a single amplitude coefficient and a single phase coefficient are reported for an entire CSI reporting band.

6. The UE of claim 1, wherein the set of $L^2$ coefficients form a L×L Hermitian matrix C whose (i,j)-th and (j, i)-th entries are conjugates of each other such that $c_{i,j}=c_{j,i}^*$ and only one of an upper triangle ($\{c_{i,j}\}$ such that i≥j) or a lower triangle ($\{c_{i,j}\}$ such that i≤j) of the coefficient matrix C is reported using the CMI.

7. The UE of claim 1, wherein the CMI reported in the CSI feedback comprises a first precoding matrix index (PMI) indicator for the set of L basis vectors and a second PMI for the set of $L^2$ coefficients.

8. A base station (BS) for channel state information (CSI) feedback, the BS comprising:
    a processor configured to generate CSI feedback configuration information for reporting of a covariance matrix indicator (CMI) indicating a N×N channel covariance matrix (K) associated with a downlink channel matrix, wherein N is a number of antenna ports at the BS; and
    a transceiver operably connected to the processor, the transceiver configured to:
        transmit, to a user equipment (UE), the CSI feedback configuration information; and
        receive, from the UE, the CSI feedback including the reported CMI over an uplink channel,
    wherein the reported CMI indicates a set of L basis vectors $\{a_i\}$, i=0, 1, 2, . . . , L−1, each comprising a dimension N×1, and a set of $L^2$ coefficients, $\{c_{i,j}\}$, i,j=0, 1, 2, . . . , L−1, and that represent the covariance matrix (K) as a weighted linear sum $\tilde{K}=\Sigma_{i=0}^{L-1}\Sigma_{j=0}^{L-1}c_{i,j}a_ia_j^H$, and wherein L≤N and $^H$ denotes a Hermitian transpose.

9. The BS of claim 8, wherein:
$\tilde{K}=W_1W_2W_1^H=\Sigma_{i=0}^{L-1}\Sigma_{j=0}^{L-1}c_{i,j}a_ia_j^H$,
$W_1=[a_{0,0}\ a_1\ \ldots\ a_{L-1}]$ is a N×L basis matrix whose columns correspond to the L basis vectors, and
$W_2=C$ is a L×L Hermitian matrix whose (i,j)-th entry is a coefficient $c_{i,j}$.

10. The BS of claim 8, wherein:
$N=2N_1N_2$ antenna ports at the BS are dual-polarized into two polarizations (polarization 0 and polarization 1), each with $N_1N_2$ antenna ports, where $N_1$ and $N_2$ are the number of antenna ports in a first and a second dimensions, respectively, $$L = 2L',$$

$$\tilde{K} = W_1 W_2 W_1^H = \begin{bmatrix} B_0 & 0 \\ 0 & B_1 \end{bmatrix} C \begin{bmatrix} B_0 & 0 \\ 0 & B_1 \end{bmatrix}^H = \sum_{i=0}^{2L'-1} \sum_{j=0}^{2L'-1} c_{i,j} a_i a_j^H,$$

$a_i$ is an i-th column of $$W_1 = \begin{bmatrix} B_0 & 0 \\ 0 & B_1 \end{bmatrix}$$

such that $$a_i = \begin{bmatrix} a_{0,i} \\ 0 \end{bmatrix}$$

if $0 \leq i \leq L'-1$ and $$a_i = \begin{bmatrix} 0 \\ a_{1,i} \end{bmatrix}$$

if $L' \leq i \leq 2L'-1$, $B_0 = [a_{0,0} \ a_{0,1} \ \ldots \ a_{0,L'-1}]$ and $B_1 = [a_{1,0} \ a_{1,1} \ \ldots \ a_{1,L'-1}]$ respectively are $N_1 N_2 \times L'$ basis matrices whose columns correspond to basis vectors for the two polarizations, and $W_2 = C$ is a $2L' \times 2L'$ Hermitian matrix whose (i,j)-th entry is a coefficient $c_{i,j}$.

11. The BS of claim 10, wherein the basis matrices are common for the two polarizations such that $B_0 = B_1$.

12. The BS of claim 8, wherein amplitude and phase of combining coefficients $\{c_{i,j}\}$ are reported separately in a wideband (WB) manner such that for each (i,j) pair, a single amplitude coefficient and a single phase coefficient are reported for an entire CSI reporting band.

13. The BS of claim 8, wherein the set of $L^2$ coefficients form a L×L Hermitian matrix C whose (i,j)-th and (j,i)-th entries are conjugates of each other such that $c_{i,j} = c_{j,i}^*$ and only one of an upper triangle ($\{c_{i,j}\}$ such that i≥j) or a lower triangle ($\{c_{i,j}\}$ such that i≤j) of the coefficient matrix C is reported using the CMI.

14. The BS of claim 8, wherein the CMI reported in the CSI feedback comprises a first precoding matrix index (PMI) indicator for the set of L basis vectors and a second PMI for the set of $L^2$ coefficients.

15. A method for channel state information (CSI) feedback by a user equipment (UE), the method comprising:

receiving, by the UE from a base station (BS), CSI feedback configuration information to report a covariance matrix indicator (CMI) indicating a N×N channel covariance matrix (K) associated with a downlink channel matrix, wherein N is a number of antenna ports at the BS;

identifying, by the UE, the CMI that indicates a set of L basis vectors $\{a_i\}$, i=0, 1, 2, ..., L−1, each comprising a dimension N×1, and a set of $L^2$ coefficients, $\{c_{i,j}\}$, i,j=0, 1, 2, ..., L−1, and that represent the covariance matrix (K) as a weighted linear sum $\tilde{K} = \sum_{i=0}^{L-1} \sum_{j=0}^{L-1} c_{i,j} a_i a_j^H$, wherein L≤N and $^H$ denotes a Hermitian transpose; and transmitting, by the UE to the BS, the CSI feedback including the identified CMI over an uplink channel.

16. The method of claim 15, wherein:

$$\tilde{K} = W_1 W_2 W_1^H = \sum_{i=0}^{L-1} \sum_{j=0}^{L-1} c_{i,j} a_i a_j^H,$$

$W_1 = [a_0 \ a_1 \ \ldots \ a_{L-1}]$ is a N×L basis matrix whose columns correspond to the L basis vectors, and $W_2 = C$ is a L×L Hermitian matrix whose (i,j)-th entry is a coefficient $c_{i,j}$.

17. The method of claim 15, wherein:

$N = 2N_1 N_2$ antenna ports at the BS are dual-polarized into two polarizations (polarization 0 and polarization 1), each with $N_1 N_2$ antenna ports, where $N_1$ and $N_2$ are the number of antenna ports in a first and a second dimensions, respectively, $$L = 2L',$$

$$\tilde{K} = W_1 W_2 W_1^H = \begin{bmatrix} B_0 & 0 \\ 0 & B_1 \end{bmatrix} C \begin{bmatrix} B_0 & 0 \\ 0 & B_1 \end{bmatrix}^H = \sum_{i=0}^{2L'-1} \sum_{j=0}^{2L'-1} c_{i,j} a_i a_j^H,$$

$a_i$ is an i-th column of $$W_1 = \begin{bmatrix} B_0 & 0 \\ 0 & B_1 \end{bmatrix}$$

such that $$a_i = \begin{bmatrix} a_{0,i} \\ 0 \end{bmatrix}$$

if $0 \leq i \leq L'-1$ and $$a_i = \begin{bmatrix} 0 \\ a_{1,i} \end{bmatrix}$$

if $L' \leq i \leq 2L'-1$, $B_0 \ [a_{0,0} \ a_{0,1} \ \ldots \ a_{0,L'-1}]$ and $B_1 = [a_{1,0} \ a_{1,1} \ a_{1,L'-1}]$ respectively are $N_1 N_2 \times L'$ basis matrices whose columns correspond to basis vectors for the two polarizations, and $W_2 = C$ is a $2L' \times 2L'$ Hermitian matrix whose (i,j)-th entry is a coefficient $c_{i,j}$.

18. The method of claim 17, wherein the basis matrices are common for the two polarizations such that $B_0 = B_1$.

19. The method of claim 15, wherein amplitude and phase of combining coefficients $\{c_{i,j}\}$ are reported separately in a wideband (WB) manner such that for each (i,j) pair, a single amplitude coefficient and a single phase coefficient are reported for an entire CSI reporting band.

20. The method of claim 15, wherein the set of $L^2$ coefficients form a L×L Hermitian matrix C whose (i,j)-th and (j,i)-th entries are conjugates of each other such that $c_{i,j} = c_{j,i}^*$ and only one of an upper triangle ($\{c_{i,j}\}$ such that i≥j) or a lower triangle ($\{c_{i,j}\}$ such that i≤j) of the coefficient matrix C is reported using the CMI.

* * * * *